US012670823B2

(12) United States Patent
Lee et al.

(10) Patent No.: US 12,670,823 B2
(45) Date of Patent: Jun. 30, 2026

(54) DISPLAY DEVICE, METHOD OF CONTROLLING PIXELS, AND ELECTRONIC DEVICE

(71) Applicant: SAMSUNG DISPLAY CO., LTD., Yongin-si (KR)

(72) Inventors: Sang Min Lee, Yongin-si (KR); Se Byung Chae, Yongin-si (KR); Hyun Chang Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/988,763

(22) Filed: Dec. 19, 2024

(65) Prior Publication Data

US 2025/0384802 A1 Dec. 18, 2025

(30) Foreign Application Priority Data

Jun. 18, 2024 (KR) ........................ 10-2024-0078758
Jul. 17, 2024 (KR) ........................ 10-2024-0094619

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01); *G09G 2300/0861* (2013.01); *G09G 2310/0291* (2013.01); *G09G 2310/0297* (2013.01); *G09G 2310/08* (2013.01)

(58) Field of Classification Search
CPC ....... G09G 2310/08; G09G 2310/0297; G09G 2310/0291; G09G 2300/0861; G09G 2300/0842; G09G 2300/0819; G09G 3/20
See application file for complete search history.

(56) References Cited

U.S. PATENT DOCUMENTS

| | | | | |
|---|---|---|---|---|
| 8,144,100 | B2 | 3/2012 | Woo et al. | |
| 11,798,451 | B2 | 10/2023 | Ha et al. | |
| 2019/0051337 | A1* | 2/2019 | Jo | G09G 3/20 |
| 2021/0043132 | A1* | 2/2021 | Nam | G09G 3/32 |
| 2023/0005405 | A1* | 1/2023 | Ha | G09G 3/3685 |

FOREIGN PATENT DOCUMENTS

| | | | |
|---|---|---|---|
| KR | 10-0630699 | B1 | 9/2006 |
| KR | 10-2023-0006140 | A | 1/2023 |

* cited by examiner

*Primary Examiner* — Julie Anne Watko
(74) *Attorney, Agent, or Firm* — F. Chau & Associates, LLC

(57) ABSTRACT

An embodiment of the present disclosure provides a display device including: a display panel including pixels; and a data driver connected to the pixels through data lines, wherein the data driver includes a latch unit that receives first image data synchronized with a horizontal synchronization signal and outputs the first image data in response to a first latch clock signal generated at a time that is delayed from a signal at which the horizontal synchronization signal is generated; a digital-to-analog converting unit that generates data voltages corresponding to the first image data using gamma voltages; and an output buffering unit that outputs the data voltages corresponding to the first image data to some of the data lines in response to a first switching control signal generated at a time that is delayed from a time at which the horizontal synchronization signal is generated.

20 Claims, 10 Drawing Sheets

DISPLAY DEVICE, METHOD OF CONTROLLING PIXELS, AND ELECTRONIC DEVICE

CROSS-REFERENCE

This application claims priority under 35 U.S.C. § 119 to Korean Patent Application No. 10-2024-0078758, filed on Jun. 18, 2024, and to Korean Patent Application No. 10-2024-0094619, filed on Jul. 17, 2024, the disclosures of which are herein incorporated by reference in their entireties.

FIELD

The present disclosure relates to an electronic device, and more particularly, to a display device, a method of controlling pixels, and an electronic device.

INTRODUCTION

A display device may include a display panel including pixels, a scan driver for sequentially applying scan signals to scan lines connected to rows of pixels, and a data driver for applying data signals to data lines connected to columns of pixels.

The data driver may be connected to the display panel and may provide data voltages to the pixels of the display panel through the data lines. The pixels of the display panel may display an image based on the data voltages received from the data driver.

The above introduction is intended to enhance understanding of the background of the inventive concept, and may contain information that is neither prior art to the present disclosure nor already known to those of ordinary skill in the pertinent art.

SUMMARY

An embodiment of the present disclosure provides a display device with high reliability. For example, the display device may reduce unnecessary dynamic current and improve the de-sense phenomenon, in which communication performance deteriorates due to noise, by providing a switching control signal synchronized with a latch clock signal delayed from a horizontal synchronization signal to an output buffer portion.

An embodiment of the present disclosure provides a method of controlling pixels with high reliability.

An embodiment of the present disclosure provides a display device including: a display panel having pixels; and a data driver connected to the pixels through data lines, wherein the data driver includes a latch unit that receives first image data synchronized with a horizontal synchronization signal and outputs the first image data in response to a first latch clock signal generated at a time that is delayed from a time at which the horizontal synchronization signal is generated; a digital-to-analog converting unit that generates data voltages corresponding to the first image data using gamma voltages; and an output buffering unit that outputs the data voltages corresponding to the first image data to some of the data lines in response to a first switching control signal generated at a time that is delayed from a time at which the horizontal synchronization signal is generated.

The first latch clock signal and the first switching control signal may be synchronized with the horizontal synchronization signal.

The first switching control signal may be synchronized with the first latch clock signal.

The first latch clock signal may be generated at a time that is delayed by a first time from the time at which the horizontal synchronization signal is generated, and the first switching control signal may be generated at the time that is delayed by the first time from the time at which the horizontal synchronization signal is generated.

The latch unit may include a first latch that outputs the first image data in response to the first latch clock signal; and a second latch that receives second image data synchronized with the horizontal synchronization signal and outputs the second image data in response to a second latch clock signal generated at a time that is delayed by a second time from a time at which the horizontal synchronization signal is generated, the digital-to-analog converting unit may further generate data voltages corresponding to the second image data using the gamma voltages, and the output buffering unit may include a first buffer circuit that outputs the data voltages corresponding to the first image data to a set of the data lines in response to the first switching control signal; and a second buffer circuit that outputs the data voltages corresponding to the second image data to another set of the data lines in response to a second switching control signal generated at a time that is delayed by the second time from a time at which the horizontal synchronization signal is generated.

The second time may be different from the first time.

The data driver may further include a shift register that stores the first image data based on the horizontal synchronization signal, and the latch unit may receive the first image data from the shift register.

The data driver may further include a control unit that enables each of the first latch clock signal and the first switching control signal at a time that is delayed from a time at which the horizontal synchronization signal is generated.

The data lines may include first and second data lines, and the output buffering unit may include a first multiplexer that receives first and second data voltages among the data voltages and selectively outputs one of the first and second data voltages to the first data line in response to the first switching control signal; and a second multiplexer that receives the first and second data voltages and selectively outputs one of the first and second data voltages to the second data line in response to the first switching control signal.

The first multiplexer may output the first data voltage when the first switching control signal has a first logic level and output the second data voltage when the first switching control signal has a second logic level, and the second multiplexer may output the second data voltage when the first switching control signal has the first logic level and output the first data voltage when the first switching control signal has the second logic level.

The output buffering unit may further include a first amplifier connected between the first multiplexer and the first data line; and a second amplifier connected between the second multiplexer and the second data line.

An embodiment of the present disclosure provides a method of controlling pixels connected to data lines, including: providing first image data synchronized with a horizontal synchronization signal; generating a first latch clock signal at a time that is delayed from a time at which the horizontal synchronization signal is generated; outputting the first image data in response to the first latch clock signal; generating data voltages corresponding to the first image data using gamma voltages; generating a first switching control signal at a time that is delayed from a time at which the horizontal synchronization signal is generated; and outputting data voltages corresponding to the first image data to a set of the data lines in response to the first switching control signal.

The first latch clock signal may be generated at a time that is delayed by a first time from the time at which the horizontal synchronization signal is generated, and the first switching control signal may be generated at the time that is delayed by the first time from the time at which the horizontal synchronization signal is generated.

The second time may be different from the first time.

The outputting of the data voltages corresponding to the first image data to some of the data lines may further include receiving first and second data voltages of the data voltages; selectively outputting one of the first and second data voltages to a first data line among the data lines in response to the first switching control signal; and selectively outputting one of the first and second data voltages to a second data line among the data lines in response to the first switching control signal.

The outputting to the first data line among the data lines may include outputting the first data voltage when the first switching control signal has a first logic level and outputting the second data voltage when the first switching control signal has a second logic level, and the outputting to the second data line among the data lines may include outputting the second data voltage when the first switching control signal has the first logic level and outputting the first data voltage when the first switching control signal has the second logic level.

An embodiment of the present disclosure provides an electronic device comprising: a processor; a memory; a power supply; an input/output unit; a display panel including pixels; and a data driver connected to the pixels through data lines, wherein the data driver includes: a latch unit that receives first image data synchronized with a horizontal synchronization signal and outputs the first image data in response to a first latch clock signal generated at a time that is delayed from a signal at which the horizontal synchronization signal is generated; a digital-to-analog converting unit that generates data voltages corresponding to the first image data using gamma voltages; and an output buffering unit that outputs the data voltages corresponding to the first image data to some of the data lines in response to a first switching control signal generated at a time that is delayed from a time at which the horizontal synchronization signal is generated.

The data driver may include a shift register that stores the first image data based on the horizontal synchronization signal, and the latch unit may receive the first image data from the shift register.

The data driver may include a control unit that enables each of the first latch clock signal and the first switching control signal at a time that is delayed from a time at which the horizontal synchronization signal is generated.

DETAILED DESCRIPTION

Hereinafter, illustrative embodiments of the present disclosure will be described in detail with reference to the accompanying drawings. The following description is intended to provide sufficient disclosure to enable understanding of the operation of the inventive concept by those of ordinary skill in the pertinent art, and other disclosure may be omitted to avoid obscuring the scope of the inventive concept. In addition, the inventive concept may be embodied in different forms and is not limited to embodiments set forth herein. The embodiments described herein are provided for the purpose of describing the technical details of the inventive concept in sufficient depth for those skilled in the pertinent art to easily practice embodiments thereof.

Throughout the specification, when it is described that an element is "connected" to another element, this includes being "directly connected", as well as being "indirectly connected" with another device therebetween. The terms used herein are for the purpose of describing specific embodiments and are not intended to limit the scope of the inventive concept. Throughout the specification, unless explicitly described to the contrary, the word "comprise" and variations thereof such as "comprises" or "comprising" will be understood to imply the inclusion of stated elements but not necessarily the exclusion of any other elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated or listed items.

Although the terms first, second, or the like, may be used herein to describe various constituent elements, these constituent elements should not be limited by these terms. These terms are used to distinguish one constituent element from another. Thus, a first constituent element discussed below could be termed a second constituent element without departing from the teachings of the present disclosure.

Figure 1:
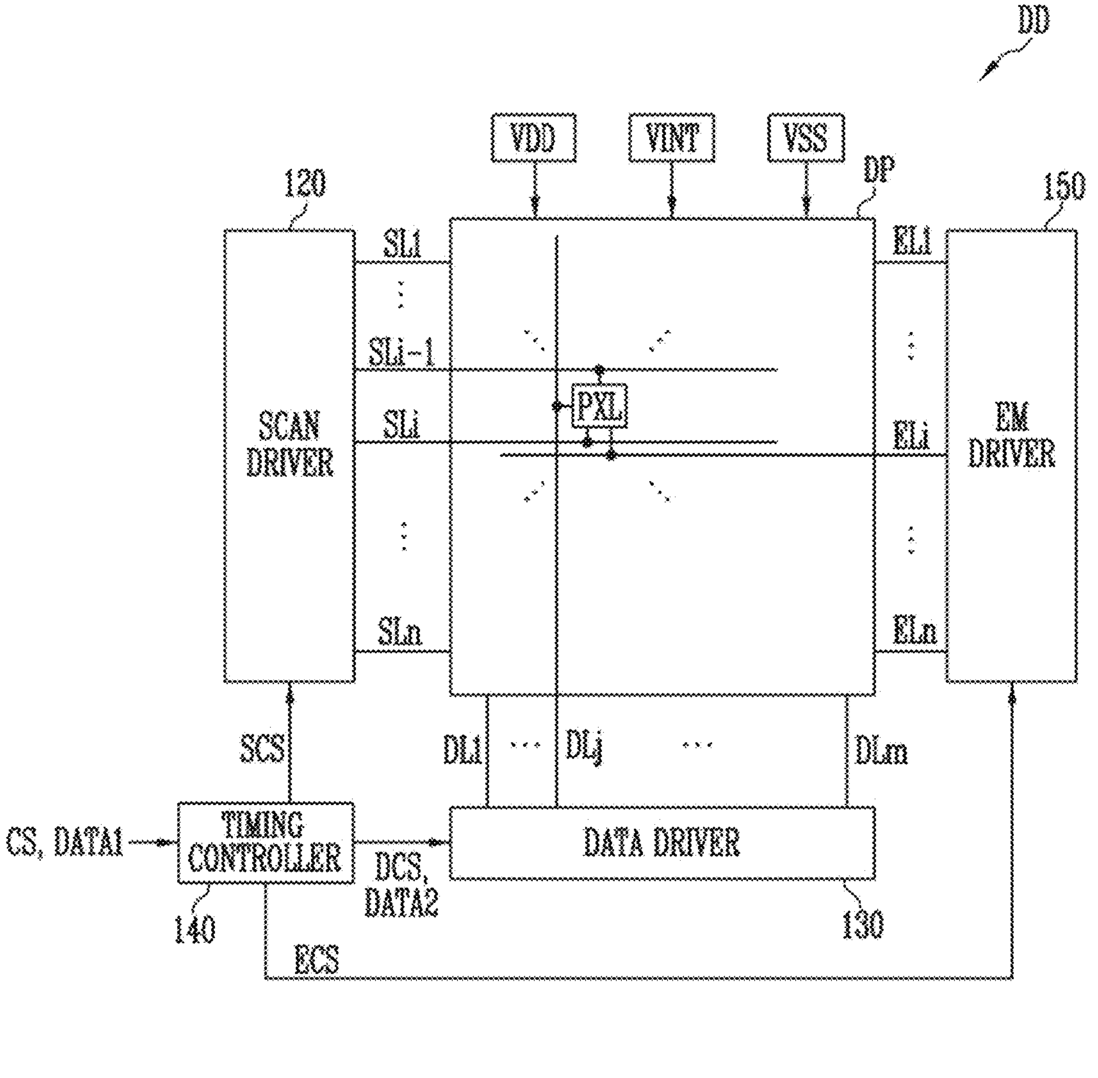
FIG. 1 is a block diagram of a display device according to an embodiment of the present disclosure.

FIG. 1 illustrates a display device according to an embodiment of the present disclosure.

Referring to FIG. 1, a display device DD may include a display panel DP, a gate driver or scan driver 120, a source driver or data driver 130, a timing controller 140, and an emission driver 150.

The display panel DP may include scan lines SL1 to SLn, where n is a positive integer, data lines DL1 to DLm, where m is a positive integer, emission control lines EL1 to ELn, and pixels PXL. The pixels PXL may be disposed in an area, such as a pixel area, partitioned by the scan lines SL1 to SLn, the data lines DL1 to DLm, and the emission control lines EL1 to ELn.

Each of the pixels PXL may include at least one light-emitting element configured to generate light. Accordingly, the pixels PXL may respectively generate light of a specific color, such as red, green, blue, cyan, magenta, yellow, or the like.

The pixels PXL may be connected to the scan driver 120 through first to n-th scan lines SL1 to SLn. Moreover, the pixels PXL may be connected to the data driver 130 through first to m-th data lines DL1 to DLm. In addition, the pixels PXL may be connected to the emission driver 150 through first to n-th emission control lines EL1 to ELn.

For example, pixels disposed in an i-th row, where i is an integer greater than or equal to 1 and less than or equal to n, and a j-th column, where j is an integer greater than or equal to 1 and less than or equal to m, among the pixels PXL, may be connected to a scan line SLi, a previous scan line SLi−1 adjacent to the i-th scan line SLi, a j-th data line DLj, and an i-th emission control line ELi. The corresponding pixel may be initialized in response to a previous scan signal provided at a previous time point or through the previous scan line SLi−1. The corresponding pixel may store or record a data signal provided through the j-th data line DLj in response to a current scan signal provided at a current time point or through the i-th scan line SLi. The corresponding pixel may emit light with a luminance corresponding to the stored data signal in response to an emission control signal provided through the i-th emission control line ELi.

First and second power voltages VDD and VSS may be provided to the display panel DP. The first and second power voltages VDD and VSS may be voltages applied to operate the pixels PXL. The first power voltage VDD may have a voltage level higher than a voltage level of the second power voltage VSS. In addition, an initialization power voltage VINT may be provided to the display panel DP. The first and second power voltages VDD and VSS and the initialization power voltage VINT may be provided by an external device to the display device DD.

The scan driver 120 may generate a scan signal based on a scan control signal SCS. The scan driver 120 may sequentially provide the scan signal to the scan lines SL1 to SLn. Here, the scan control signal SCS may include a start signal, clock signals, and the like, and may be provided by the timing controller 140. For example, the scan driver 120 may include a shift register or stage that sequentially generates and outputs a pulse type of scan signal corresponding to a pulse type of start signal by using the clock signals.

The scan driver 120 may be disposed on one side of the display panel DP. However, embodiments are not limited thereto. For example, the scan driver 120 may be divided into two or more physically and/or logically separated drivers, and the drivers may be disposed on one side of the display panel DP and the other side of the display panel DP opposite to the one side, respectively. As described above, the scan driver 120 may be disposed around the display panel DP in various forms according to various embodiments.

The emission driver 150 may generate an emission control signal based on an emission driving control signal ECS. The emission driver 150 may sequentially or simultaneously provide the emission control signal to the emission control lines EL1 to ELn. Here, the emission driving control signal ECS may include an emission start signal, emission clock signals, and the like, and may be provided by the timing controller 140. For example, the emission driver 150 may include a shift register that sequentially generates and outputs a pulse-type emission control signal corresponding to a pulse-type emission start signal using the emission clock signals.

The data driver 130 may generate data signals based on image data DATA2 and a data control signal DCS provided by the timing controller 140. The data driver 130 may provide the data signals to the display panel DP or the pixels PXL. Here, the data control signal DCS is a signal controlling an operation of the data driver 130, and may include a load signal or data enable signal indicating output of an effective data signal. For example, the data driver 130 may generate gamma voltages and select one of the gamma voltages corresponding to the grayscale value in the image data DATA2 to output a data signal such as a data voltage.

The timing controller 140 may control various operations of the display device DD. The timing controller 140 may receive input image data DATA1 and a control signal CS from the outside, such as, for example, from a graphics processor. The timing controller 140 may generate the scan control signal SCS and the data control signal DCS based on the control signal CS. The timing controller 140 may convert the input image data DATA1 to generate the image data DATA2. Here, the control signal CS may include a vertical synchronization signal, a horizontal synchronization signal, a clock, and the like. The vertical synchronization signal may indicate the start of frame data, such as data corresponding to a frame period in which one frame image is displayed. The horizontal synchronization signal may indicate the start of a data row, such as one of a plurality of data rows included in the frame data. For example, the timing controller 140 may convert the input image data DATA1 of an RGB format into the image data DATA2 of an RGBG format that matches a pixel arrangement in the display panel DP.

In addition, two or more components of the data driver 130, the timing controller 140, and the emission driver 150 may be mounted on a single integrated circuit. For example, the data driver 130, the timing controller 140, and the emission driver 150 may be included in the driver integrated circuit. In this case, the data driver 130, the timing controller 140, and the emission driver 150 may be functionally separate components within one driver integrated circuit. In an embodiment, at least one of the data driver 130, the timing controller 140, and the emission driver 150 may be provided as a separate component from the driver integrated circuit.

Figure 2:
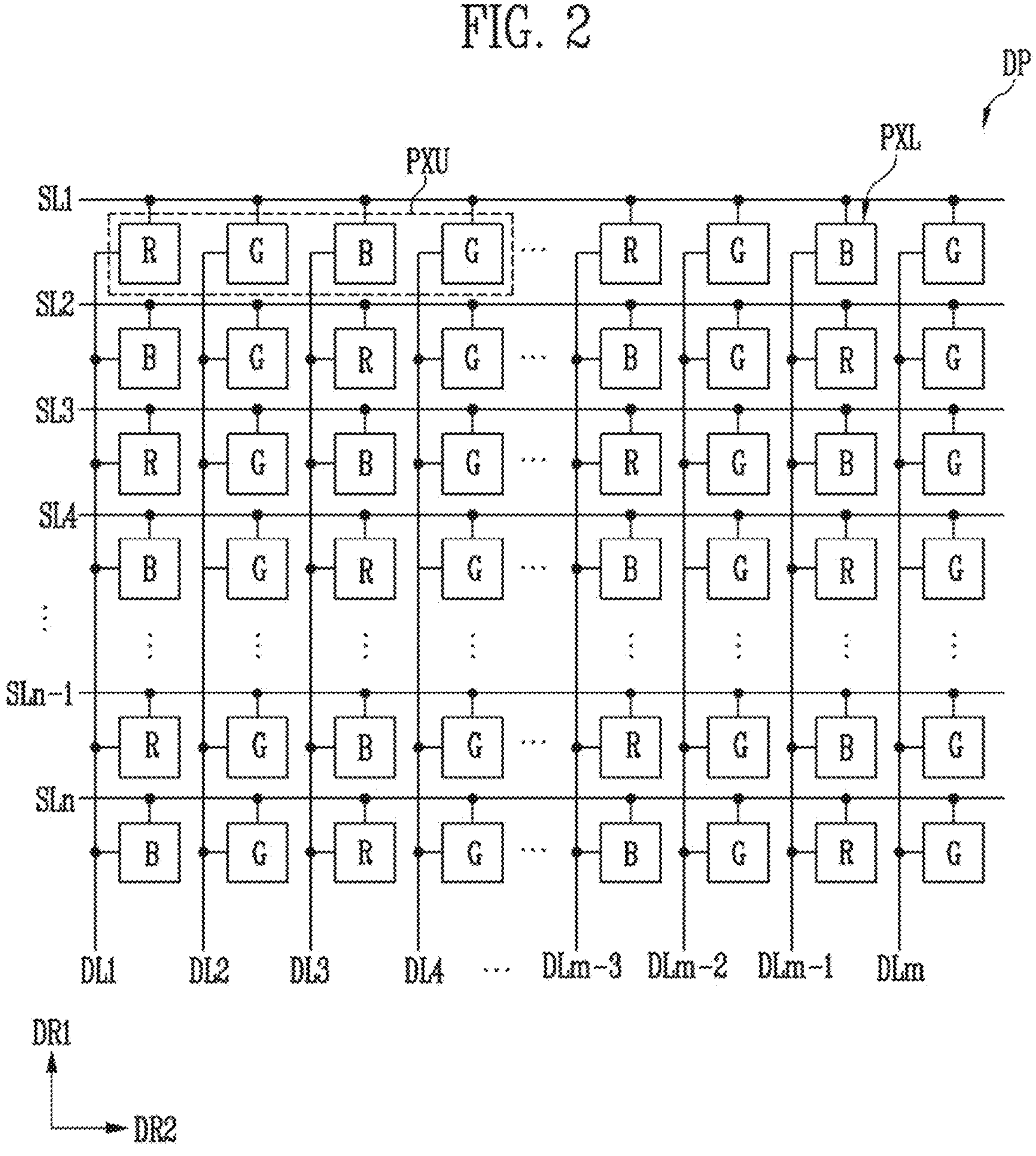
FIG. 2 is a block diagram of an embodiment of pixels included in a display panel of FIG. 1.

FIG. 2 illustrates an embodiment of pixels included in a display panel of FIG. 1. In FIG. 2, only the scan lines SL1 to SLn and the data lines DL1 to DLm among the signal lines are schematically illustrated for clarity and simplicity, and the emission control lines EL1 to ELn (see FIG. 1) are omitted from the illustration.

Referring to FIG. 2, the pixels PXL may be disposed in an area in which the scan lines SL1 to SLn, arranged for example in a first direction DR1 and extending in a second direction DR2, and the data lines DL1 to DLm, arranged for example in the second direction DR2 and extending in the first direction DR1, intersect each other. The pixels PXL may receive scan signals and data signals from the scan lines SL1 to SLn and the data lines DL1 to DLm, respectively. The pixels PXL may emit light with luminance corresponding to input data signals when the scan signals are supplied.

For example, the pixels PXL may be divided into red pixels R, green pixels G, and blue pixels B. Four pixels PXL may form one pixel unit PXU. For example, in the first row, a red pixel R, a green pixel G, a blue pixel B, and a green pixel G may be sequentially disposed, and these four pixels PXL may form one pixel unit PXU. The pixel units formed of the pixels PXL disposed in the first row may sequentially emit light within one horizontal period. In the second row, a blue pixel B, a green pixel G, a red pixel R, and a green pixel G may be sequentially disposed, and the four pixels PXL may form a pixel unit PXU. The pixel units formed of the pixels PXL disposed in the second row may sequentially emit light within one horizontal period. Pixels disposed in the remaining rows may also be configured similarly to the pixels disposed in the first and second rows.

In an embodiment, the display panel DP may have a PENTILE™ structure in which red, green, and blue pixels are alternately disposed. In this case, red pixels R and blue pixels B may be alternately disposed in odd-numbered pixel columns among the pixel columns, and green pixels G may be disposed in a single line in the even-numbered pixel columns among the pixel columns. However, the disposition structure of the pixels PXL is not limited thereto, and may be one of various other pixel disposition structures.

For example, in the pixels PXL of the first column, pixels of two different colors may be alternately disposed. For example, in the pixels PXL of the first column, red pixels R and blue pixels B may be alternately disposed. In addition, the pixels PXL of the first column may be connected to the first data line DL1. In the pixels PXL of the second column, green pixels G may be disposed, and the second data line DL2 may be connected to the green pixels G. In the pixels PXL of the third column, blue pixels B and red pixels R may be alternately disposed, and may be connected to the third data line DL3. In the pixels PXL of the fourth column, green pixels G may be disposed, and the fourth data line DL4 may be connected to the green pixels G. In addition, the pixels disposed in the remaining columns may be configured so that four columns are repeated corresponding to the pixels of the first to fourth columns. The four repeated columns may be configured similarly to the pixels of the first to fourth columns.

Data signals applied to the first to m-th data lines DL1 through DLm may be set corresponding to colors of the pixels PXL. For example, the first data line DL1 may be set to output a data signal to be supplied to the red pixels R and a data signal to be supplied to the blue pixels B. The second data line DL2 may be set to output a data signal to be supplied to the green pixels G.

Figure 3:
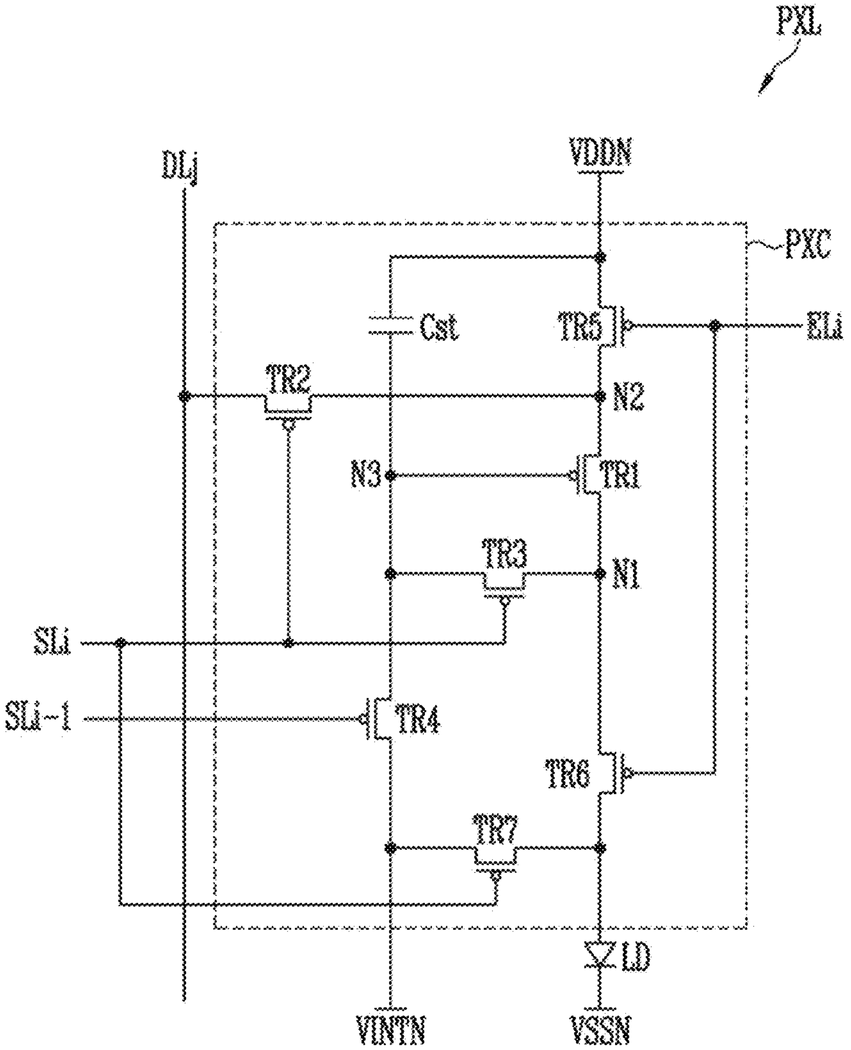
FIG. 3 is a circuit diagram of an embodiment of one of the pixels included in the display device of FIG. 1.

FIG. 3 illustrates an embodiment of one of the pixels included in the display device of FIG. 1.

Referring to FIG. 3, the pixel PXL may include a pixel circuit PXC and a light-emitting element LD.

In an embodiment, the pixel circuit PXC may be connected to the i-th scan line SLi, the (i−1)-th scan line SLi−1, the i-th emission control line ELi, and the j-th data line DLj.

The pixel circuit PXC may include first to seventh transistors TR1 to TR7, a storage capacitor Cst, and a light-emitting element LD.

A first electrode of the first transistor TR1 may be connected to a second node N2 and may be connected to a first power node VDDN via the fifth transistor TR5. A second electrode of the first transistor TR1 may be connected to a first node N1 and may be connected to an anode electrode of the light-emitting element LD via the sixth transistor TR6. A gate electrode of the first transistor TR1 may be connected to a third node N3. The first transistor TR1 may control the amount of current flowing from the first power node VDDN to the second power node VSSN via the light-emitting element LD in response to the voltage of the third node N3. The first transistor TR1 may be referred to as a driving transistor.

The second transistor TR2 may be connected between the j-th data line DLj and the second node N2. A gate electrode of the second transistor TR2 may be connected to the ith scan line SLi. The second transistor TR2 may be turned on when a scan signal is supplied to the i-th scan line SLi to electrically connect the j-th data line DLj to the second node N2 and the first electrode of the first transistor TR1. The second transistor TR2 may be referred to as a switching transistor.

The third transistor TR3 may be connected between the first node N1 and the third node N3. A gate electrode of the third transistor TR3 may be connected to the i-th scan line SLi. The third transistor TR3 may be turned on when a scan signal is supplied to the i-th scan line SLi to electrically connect the first node N1 and the third node N3. Accordingly, when the third transistor TR3 is turned on, the first transistor TR1 may be diode-connected.

The storage capacitor Cst may be connected between the first power node VDDN and the third node N3. The storage capacitor Cst may store a data signal and a voltage corresponding to a threshold voltage of the first transistor TR1.

The fourth transistor TR4 may be connected between the third node N3 and the initialization power node VINTN. A gate electrode of the fourth transistor TR4 may be connected to the (i−1)-th scan line SLi−1, which is a previous scan line. The fourth transistor TR4 may be turned on when a scan signal is supplied to the (i−1)-th scan line SLi−1 to supply the initialization power voltage VINT from the initialization power node VINTN to the first node N1 via the third transistor TR3. Here, the initialization power voltage VINT may be set to have a voltage level lower than that of the data signal.

The fifth transistor TR5 may be connected between the first power node VDDN and the second node N2. A gate electrode of the fifth transistor TR5 may be connected to the i-th emission control line ELi. The fifth transistor TR5 may be turned off when an emission control signal is supplied to the i-th emission control line ELi, and may be turned on in other cases.

The sixth transistor TR6 may be connected between the first node N1 and the light-emitting element LD. A gate electrode of the sixth transistor TR6 may be connected to the i-th emission control line ELi. The sixth transistor TR6 may be turned off when an emission control signal is supplied to the i-th emission control line ELi, and may be turned on in other cases.

The seventh transistor TR7 may be connected between the initialization power node VINTN and the anode electrode of the light-emitting element LD. A gate electrode of the seventh transistor TR7 may be connected to the i-th scan line SLi. The seventh transistor TR7 may be turned on when a scan signal is supplied to the i-th scan line SLi to supply the initialization power voltage VINT to the anode electrode of the light-emitting element LD.

As described above, the pixel circuit PXC may include the first to seventh transistors TR1 to TR7 and the storage capacitor Cst. However, embodiments are not limited thereto. The pixel circuit PXC may be implemented as one of various circuits including a plurality of transistors and one or more capacitors. For example, the pixel circuit PXC may include two transistors and two capacitors. According to an embodiment of the pixel circuit PXC, the number of sub-data lines included in the j-th data line DLj and the number of sub-emission control lines included in the i-th emission control line ELi may be changed.

The first to seventh transistors TR1 to TR7 may be P-type transistors. Each of the first to seventh transistors TR1 to TR7 may be a metal oxide silicon field-effect transistor (MOSFET). However, embodiments are not limited thereto. For example, at least one of the first to seventh transistors TR1 to TR7 may be replaced with an N-type transistor.

In an embodiment, the first to seventh transistors TR1 to TR7 may include an amorphous silicon semiconductor, a monocrystalline silicon semiconductor, a polycrystalline silicon semiconductor, and an oxide semiconductor.

The light-emitting element LD may include an anode electrode, a cathode electrode, and a light-emitting layer. The light-emitting layer may be disposed between the anode electrode and the cathode electrode. After the data signal transmitted through the j-th data line DLj is reflected in the voltage of the second node N2, the fifth and sixth transistors TR5 and TR6 may be turned on when the emission control signals of the i-th emission control line ELi are enabled such as to a low level. In addition, the first transistor TR1 may be turned on according to the voltage of the third node N3, and accordingly, a current may flow from the first power voltage node VDDN to the second power voltage node VSSN. The light-emitting element LD may emit light depending on the amount of current flowing.

Figure 4:
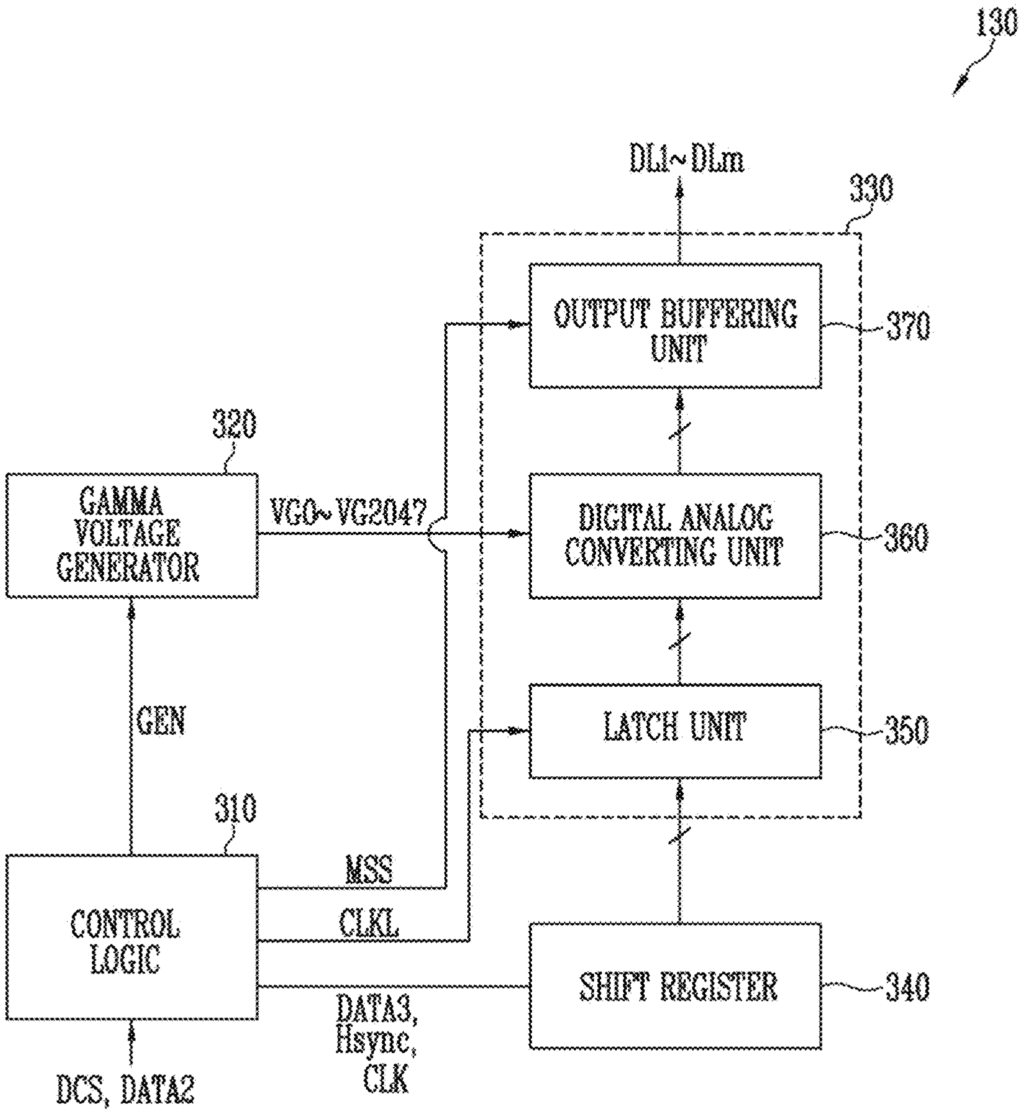
FIG. 4 is a block diagram of an embodiment of a data driver included in the display device of FIG. 1.

FIG. 4 illustrates an embodiment of a data driver included in the display device of FIG. 1.

Referring to FIG. 1 and FIG. 4, the source driver or data driver 130 may include control logic or a control unit 310, a gamma voltage generator 320, a data output unit 330, and a shift register 340. In addition, the data output unit 330 may include a latch unit 350, a digital-to-analog converting unit 360, and an output buffering unit 370.

The control unit 310 may receive the image data DATA2 and the data control signal DCS from the timing controller 140. The control unit 310 may further receive various control signals not shown in FIG. 4 from the timing controller 140.

The control unit 310 may change serialized image data DATA2 received from the timing controller 140 into parallelized data DATA3. The parallelized data DATA3 may be data obtained by dividing the serialized image data DATA2 into units of scan lines based on the horizontal synchronization signal Hsync. The control unit 310 may provide the parallelized data DATA3 to the shift register 340 and/or the latch unit 350.

The control unit 310 may generate latch clock signals CLKL including pulses based on the data control signal DCS. The control unit 310 may generate latch clock signals CLKL at a time that is delayed from the time at which the horizontal synchronization signal Hsync is generated. For example, the control unit 310 may enable the latch clock signals CLKL at a time that is delayed from the time at which the horizontal synchronization signal Hsync is enabled, without limitation thereto. The latch clock signals CLKL may be synchronized with the horizontal synchronization signal Hsync. The latch clock signals CLKL may be used to control an output timing of the latch unit 350.

The control unit 310 may generate switching control signals MSS including pulses based on the data control signal DCS. The control unit 310 may generate the switching control signals MSS at a time that is delayed from the time at which the horizontal synchronization signal Hsync is generated. For example, the control unit 310 may enable the switching control signals MSS at a time that is delayed from the time when the horizontal synchronization signal Hsync is enabled, without limitation thereto. The switching control signals MSS may be synchronized with the horizontal synchronization signal Hsync. The switching control signals MSS may be applied to the output buffering unit 370 and used to control the switch timing of multiplexers.

The control unit 310 may generate a gamma enable signal GEN. The gamma voltage generator 320 may receive the gamma enable signal GEN to generate gamma voltages VG0 to VG2047 having various voltage levels. Here, the gamma voltages VG0 to VG2047 may be used to convert the image data DATA2 into a data voltage or gray scale voltage. However, the gamma voltages VG0 to V2047 may include 2048 gamma voltages corresponding to 11-bit data, but embodiments are not limited thereto.

The shift register 340 may store the parallelized data DATA3 provided by the control unit 310 based on the horizontal synchronization signal Hsync. In addition, the shift register 340 may sequentially provide the parallelized data DATA3 to the latch unit 350.

The latch unit 350 may sequentially receive the parallelized data DATA3 from the shift register 340 to latch or temporarily store the parallelized data. The parallelized data DATA3 may be sequentially stored in the latch unit 350 according to a position to be output to the display panel DP (see FIG. 1). For example, the latch unit 350 may latch divided image data corresponding to each of the data lines DL1 to DLm. Here, the divided image data may be image data that may be displayed on pixels PXL (see FIG. 2) corresponding to one horizontal line applied during each horizontal period. For example, the latch unit 350 may include a plurality of latch circuits 351 to 356 (see FIG. 5) corresponding to one or more data lines.

The latch unit 350 may output line image data to the digital-to-analog converting unit 360 in response to the latch clock signals CLKL. For example, the latch unit 350 may output line image data stored at a time when the latch clock signals CLKL are enabled, such as at a rising edge time, to the digital-to-analog converting unit 360. Here, the line image data may be divided image data that is divided for each data line.

The digital-to-analog converting unit 360 may convert digital data into analog data voltages using the gamma voltages VG0 to VG2047. For example, the digital-to-analog converting unit 360 may include a plurality of digital-to-analog converter circuits 361 to 366 (see FIG. 5) corresponding to the data lines. The digital-to-analog converting unit 360 may select at least one of the gamma voltages VG0 to VG2047 corresponding to gray scale values of the line image data, and provide the selected data voltages to the output buffering unit 370.

The output buffering unit 370 may receive data voltages and output them to the data lines DL1 to DLm. The output buffering unit 370 may include buffer circuits 371 to 376 (see FIG. 5) connected to the data lines DL1 to DLm. The output buffering unit 370 may switch multiplexers in response to the switching control signals MSS. The output buffering unit 370 may selectively output data voltages output from the digital-to-analog converting unit 360 to the data lines DL1 to DLm through multiplexers.

Figure 5:
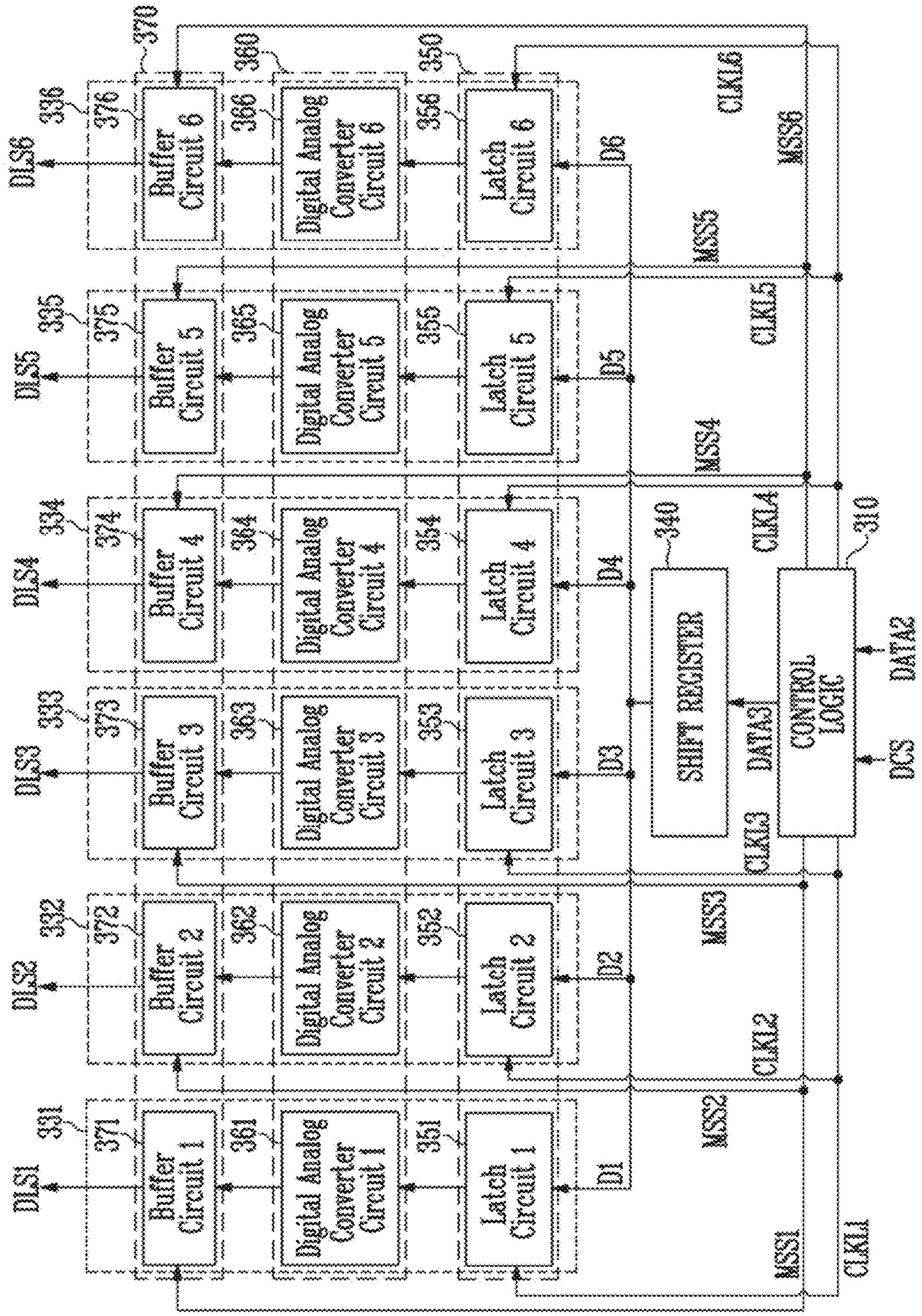
FIG. 5 is a block diagram of an embodiment of the data driver of FIG. 4.

FIG. 5 illustrates an embodiment of the data driver of FIG. 4.

Referring to FIG. 4 and FIG. 5, the data output unit 330 of the data driver 130 may include six sub-data output units 331 to 336. However, in FIG. 5, although it is described as an example that the data output unit 330 includes the first to sixth latch circuits 351 to 356, it is not limited thereto. For example, the latch unit 350 may include eight latch circuits.

Each of the sub-data output units 331 to 336 may include a latch circuit, a digital-to-analog converter circuit, and a buffer circuit. For example, the first sub-data output unit 331 may include a first latch circuit 351, a first digital-to-analog converter circuit 361, and a first buffer circuit 371. The second sub-data output unit 332 may include a second latch circuit 352, a second digital-to-analog converter circuit 362, and a second buffer circuit 372. The third sub-data output unit 333 may include a third latch circuit 353, a third digital-to-analog converter circuit 363, and a third buffer circuit 373. The fourth sub-data output unit 334 may include a fourth latch circuit 354, a fourth digital-to-analog converter circuit 364, and a fourth buffer circuit 374. The fifth sub-data output unit 335 may include a fifth latch circuit 355, a fifth digital-to-analog converter circuit 365, and a fifth buffer circuit 375. The sixth sub-data output unit 336 may include a sixth latch circuit 356, a sixth digital-to-analog converter circuit 366, and a sixth buffer circuit 376.

Each of the sub-data output units 331 to 336 may output to one of the data lines DL1 to DLm divided into six groups. For example, the first to sixth sub-data output units 331 to 336 may be connected to the first to sixth groups of data lines DLS1 to DLS6, respectively. The first to sixth sub-data output units 331 to 336 may output data voltages through the first to sixth groups of data lines DLS1 to DLS6.

In an embodiment, the latch unit 350 may include first to sixth latch circuits 351 to 356. For example, the first to sixth latch circuits 351 to 356 may receive the first to sixth divided image data D1 to D6 from the shift register 340, respectively. The first to sixth latch circuits 351 to 356 may sequentially receive the first to sixth divided image data D1 to D6 corresponding to one horizontal line of the parallelized data DATA3, without limitation thereto.

The first to sixth latch circuits 351 to 356 may receive the first to sixth latch clock signals CLKL1 to CLKL6, respectively, from the control unit 310. The first to sixth latch circuits 351 to 356 may sequentially output line image data to the digital-to-analog converter circuits 361 to 366 in response to the first to sixth latch clock signals CLKL1 to CLKL6. For example, the first latch circuit 351 may output line image data D11 to D1*j* (see FIG. 6) corresponding to the first divided image data D1 in response to the first latch clock signal CLKL1. The second latch circuit 352 may output line image data corresponding to the second divided image data D2 in response to the second latch clock signal CLKL2 delayed from the first latch clock signal CLKL1. The third to sixth latches 353 to 356 may also be configured similarly to the first and second latch circuits 351 and 352. In this case, the first to sixth latch clock signals CLKL1 to CLKL6 may be generated at different delay times depending on a spread method. For example, the first to sixth latch clock signals CLKL1 to CLKL6 may be sequentially generated. Accordingly, the first to sixth latch circuits 351 to 356 may output line image data corresponding to the first to sixth divided image data D1 to D6 at different times.

The first to sixth digital-to-analog converter circuits 361 to 366 may convert line image data received from the first to sixth latch circuits 351 to 356 into data voltages, respectively. The first to sixth digital-to-analog converter circuits 361 to 366 may output the data voltages converted from the line image data to the first to sixth buffer circuits 371 to 376, respectively.

The first to sixth buffer circuits 371 to 376 may receive data voltages from the first to sixth digital-to-analog converter circuits 361 to 366. The first to sixth buffer circuits 371 to 376 may sequentially output data voltages to the first to sixth groups of data lines DLS1 to DLS6 in response to the first to sixth switching control signals MSS1 to MSS6. For example, the first buffer circuit 371 may output data voltages corresponding to the first image data D1 to the first group of data lines DLS1 in response to the first switching control signal MSS1. The second buffer circuit 372 may output data voltages, corresponding to the second image data D2, to the second group of data lines DLS2 in response to the second switching control signal MSS2 that is delayed from the first switching control signal MSS1. The third to sixth buffer circuits 373 to 376 may also be configured similarly to the first and second buffer circuits 371 and 372. In this case, the first to sixth switching control signals MSS1 to MSS6 may be generated at different delay times depending on the spread method. For example, the first to sixth switching control signals MSS1 to MSS6 may be sequentially generated. Accordingly, the first to sixth buffer circuits 371 to 376 may output data voltages to the first to sixth groups of data lines D1 to D6 at different times, without limitation thereto.

The first to sixth latch clock signals CLKL1 to CLKL6 and the first to sixth latch circuits 351 to 356 may be provided in synchronization. Accordingly, a time at which each of the first to sixth buffer circuits 371 to 376 outputs data voltages may correspond to a time at which each of the first to sixth latch circuits 351 to 356 outputs line image data, respectively.

Figure 6:
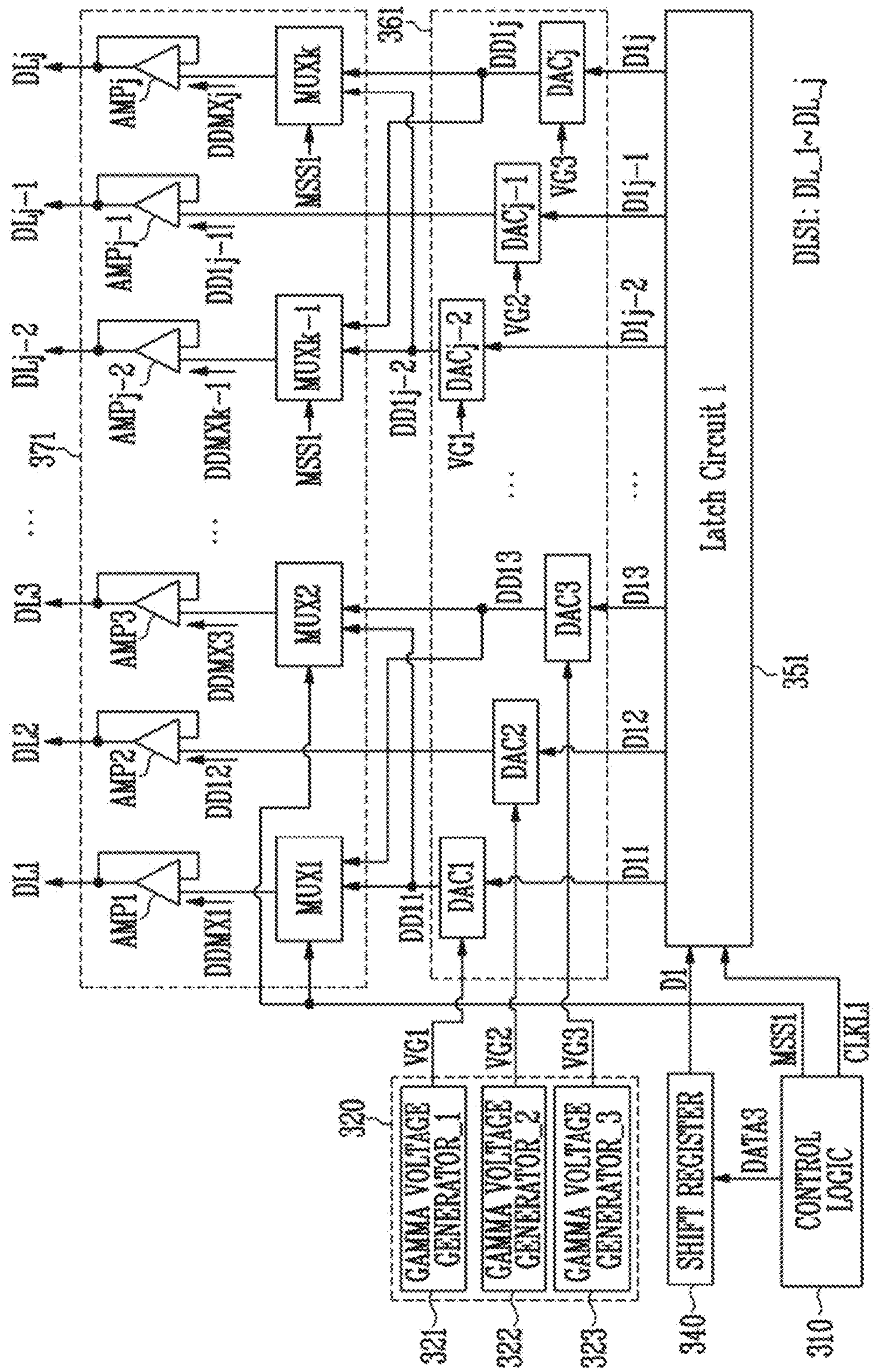
FIG. 6 is a block diagram of an embodiment of one of the data output portions included in the data driver of FIG. 5.

FIG. 6 illustrates an embodiment of one of the data output portions included in the data driver of FIG. 5.

FIG. 6 illustrates the first latch circuit 351 as a reference for better understanding and ease of description, but the second to sixth latch circuits 352 to 356 may also be configured similarly to the first latch circuit 351.

Referring to FIG. 5 and FIG. 6, the first latch circuit 351 may output the first line image data D11 in response to the first latch clock signal CLKL1. The first latch circuit 351 may output the second line image data D12 in response to the first latch clock signal CLKL1. The first latch circuit 351 may output the third line image data D13 in response to the first latch clock signal CLKL1. Here, the first and third line image data D11 and D13 may each include a data signal to be supplied to the red pixels R (see FIG. 2) and a data signal to be supplied to the blue pixels B (see FIG. 2). The second line image data D12 may include a data signal to be supplied to the green pixels G (see FIG. 2). In addition, the first latch circuit 351 may output the fourth to j-th line image data D14 to D1*j* in response to the first latch clock signal CLKL1. The fourth to j-th line image data D14 to D1*j* may also be configured similarly to the first to third line image data D11 to D13. For example, odd-numbered line image data among the fourth to j-th line image data D14 to D1*j* may include a data signal to be supplied to red pixels R and a data signal to be supplied to blue pixels B. Even-numbered line image data among the fourth to j-th line image data D14 to D1*j* may include a data signal to be supplied to green pixels G, without limitation thereto.

However, the first latch circuit 351 may simultaneously output the first to j-th line image data D11 to D1*j* to the first digital-to-analog converter circuit 361 in response to the first latch clock signal CLKL1.

The first digital-to-analog converter circuit 361 may include a plurality of digital-to-analog converters DAC1 to DACj. The digital-to-analog converters DAC1 to DACj may select and output at least one of gamma voltages corresponding to gray scale values of the first to j-th line image data D11 to D1*j*. The digital-to-analog converters DAC1 to DACj may receive first to third gamma voltages VG1 to VG3 from first to third gamma voltage generators 321 to 323, and output them as data voltages corresponding to the first to j-th line image data D11 to D1*j* from the first latch circuit 351. For example, the first digital-to-analog converter DAC1 may select one of the first gamma voltages VG1 corresponding to the gray scale values of the received first line image data D11 and convert it into the first data voltage DD11. In addition, the first digital-to-analog converter DAC1 may output the converted first data voltage DD11 to a first multiplexer MUX1. The second to j-th digital-to-analog converters DAC2 to DACj may also be configured similarly to the first digital-to-analog converter DAC1.

The first buffer circuit 371 may include a plurality of multiplexers MUX1 to MUXk and a plurality of amplifiers AMP1 to AMPj. The multiplexers MUX1 to MUXk may select one of the data voltages received from some of the plurality of digital-to-analog converters DAC1 to DACj to output the selected data voltage to the amplifiers AMP1 to AMPj. For example, the multiplexers MUX1 to MUXk may be connected to the digital-to-analog converters that convert the odd-numbered line image data.

Each of the multiplexers MUX1 to MUXk may receive data voltages from two digital-to-analog converters. In addition, each of the multiplexers MUX1 to MUXk may select and output one of the data voltages received in response to the first switching control signal MSS1. For example, the first multiplexer MUX1 may receive the first data voltage DD11 from the first digital-to-analog converter DAC1 and the third data voltage DD13 from the third digital-to-analog converter DAC3. The first multiplexer MUX1 may select one of the first and third data voltages DD11 and DD13 received in response to the first switching control signal MSS1. The first multiplexer MUX1 may output the selected data voltage DDMX1 to the first amplifier AMP1.

The first amplifier AMP1 may output the data voltage DDMX1 selected from the received first and third data voltages DD11 and DD13 to the first data line DL1. Here, the first amplifier AMP1 is connected between the first multiplexer MUX1 and the first data line DL1 and may operate as a unit buffer.

The second multiplexer MUX2 may receive the first data voltage DD11 from the first digital-to-analog converter DAC1 and receive the third data voltage DD13 from the third digital-to-analog converter DAC3. The second multiplexer MUX2 may select one of the first and third data voltages DD11 and DD13 received in response to the first switching control signal MSS1. The second multiplexer MUX2 may output the selected data voltage DDMX3 to the third amplifier AMP3.

The third amplifier AMP3 may output the data voltage DDMX3, selected from the received first and third data voltages DD11 and DD13, to the third data line DL3. Here, the third amplifier AMP3 is connected between the second multiplexer MUX2 and the third data line DL3 and may operate as a unit buffer.

Each of the first and second multiplexers MUX1 and MUX2 may output different data voltages, among the first and third data voltages DD11 and DD13, in response to the first switching control signal MSS1. For example, the first multiplexer MUX1 may output the first data voltage DD11 when the first switching control signal MSS1 has the first logic level such as a high level, and the second multiplexer MUX2 may output the second data voltage DD12 when the first switching control signal MSS1 has the first logic level. The first multiplexer MUX1 may output the second data voltage DD12 when the first switching control signal MSS1 has the second logic level such as a low level, and the second multiplexer MUX2 may output the first data voltage DD11 when the first switching control signal MSS1 has the second logic level, without limitation thereto.

The second data voltage DD12 output from the second digital-to-analog converter DAC2 may be output to the second amplifier AMP2. The second data voltage DD12 is intended to be supplied to the green pixels G (see FIG. 2), and may be output to the second amplifier AMP2 without passing through the multiplexers MUX1 to MUXk.

The second amplifier AMP2 may output the second data voltage DD12 to the second data line DL2. Here, the second amplifier AMP2 may be connected between the second digital-to-analog converter DAC2 and the second data line DL2 and may operate as a unit buffer.

In addition, the remaining multiplexers MUX3 to MUXk connected to the first digital-to-analog converter circuit 361 may also be configured similarly to the first and second multiplexers MUX1 and MUX2. The remaining amplifiers AMP4 to AMPj may also be configured similarly to the first to third amplifiers AMP1 to AMP3.

Figure 7:
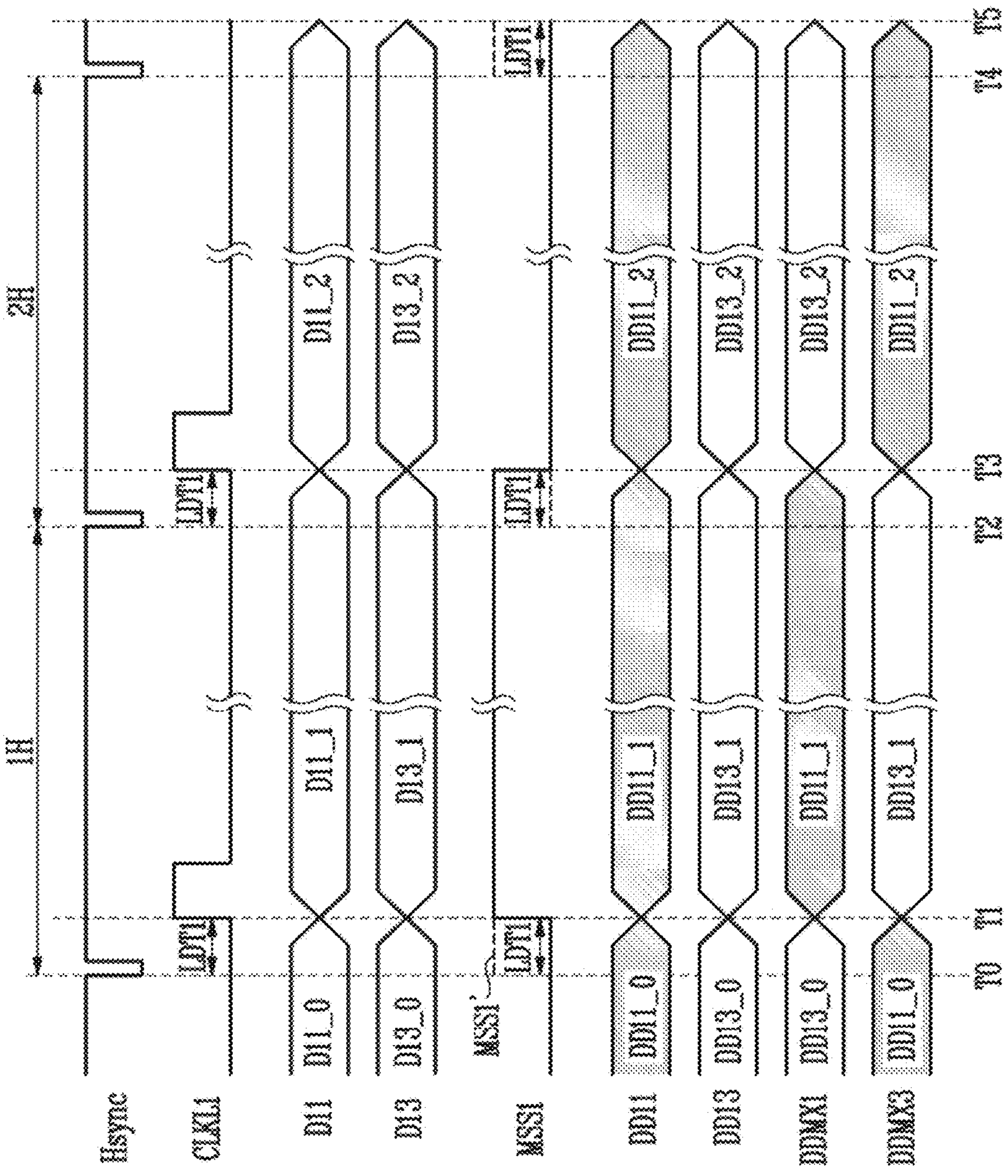
FIG. 7 is a timing diagram of an embodiment of signals associated with a data output portion of FIG. 6 in a plurality of horizontal periods.

FIG. 7 illustrates an embodiment of signals associated with a data output portion of FIG. 6 in a plurality of horizontal periods.

Referring to FIG. 6 and FIG. 7, in each of first and second horizontal periods H1 and H2 defined by the horizontal synchronization signal Hsync, the first latch circuit 351 may operate in response to the first latch clock signal CLKL1. In addition, the first multiplexer MUX1 of the first buffer circuit 371 may operate in response to the first switching control signal MSS1.

According to an embodiment, the first latch circuit 351 may output the first line image data D11 to the first digital-to-analog converter DAC1 at a time when the first latch clock signal CLKL1 is enabled such as to a high level. For example, the first latch circuit 351 may output a (1_0)-th line image data D11_0 of the previous horizontal period at a 0-th time T0. The first latch circuit 351 may output a (1_1)-th line image data D11_1 at a first time T1 when the first latch clock signal CLKL1 is enabled such as to the high level. In addition, the first latch circuit 351 may output a (1_2)-th line image data D11_2 at a third time T3 when the first latch clock signal CLKL1 is enabled again such as to the high level.

The first latch circuit 351 may operate according to the first latch clock signal CLKL1 that is enabled such as to a high level at a time that is delayed by a first delay time LDT1 from the time when the horizontal synchronization signal Hsync is enabled such as to a low level.

The first switching control signal MSS1 synchronized with the first latch clock signal CLKL1 is provided to the first multiplexer MUX1 and the second multiplexer MUX2. In an embodiment, the time when the first switching control signal MSS1 is enabled and the time when the first latch clock signal CLKL1 is enabled may be substantially the same.

In an embodiment, the first multiplexer MUX1 may output the first data voltage DDMX1 at a time when the first switching control signal MSS1 is enabled such as to a high level. The first multiplexer MUX1 may output the third data voltage DDMX3 at a time when the first switching control signal MSS1 is enabled such as to a low level. Here, the first data voltage DDMX1 may be the first data voltage DD11 corresponding to the gray scale values of the first line image data D11 or the third data voltage DD13 corresponding to the gray scale values of the third line image data D13, where original and multiplexed segments of the first data voltage DD11 shown in FIG. 7 are marked with hatching to visually differentiate them from original and multiplexed segments of the third data voltage DD13 shown in FIG. 7. The third data voltage DDMX3 may be the third data voltage DD13 corresponding to gray scale values of the third line image data D13 or the first data voltage DD11 corresponding to gray scale values of the first line image data D11.

The second multiplexer MUX2 may output the first data voltage DDMX1 at a time when the first switching control signal MSS1 is disabled such as to a low level. The second multiplexer MUX2 may output the third data voltage DDMX3 at a time when the first switching control signal MSS1 is enabled such as to a high level.

For example, the first multiplexer MUX1 may output the (13_0)-th data voltage DD13_0 converted by the third digital-to-analog converter DAC3 as the first data voltage DDMX1 at the 0-th time T0. The first multiplexer MUX1 may output the (11_1)-th data voltage DD11_1 converted by the first digital-to-analog converter DAC1 as the first data voltage DDMX1 from the first time T1 to the third time T3 when the first switching control signal MSS1 is enabled such as to a high level. In addition, the first multiplexer MUX1 may output the (13_2)-th data voltage DD13_2 converted by the third digital-to-analog converter DAC3 as the first data voltage DDMX1 from the third time T3 to the fifth time T5 when the first switching control signal MSS1 is enabled again such as to a high level.

The second multiplexer MUX2 may output the (11_0)-th data voltage DD11_0 converted by the first digital-to-analog converter DAC1 as the third data voltage DDMX3 at the 0-th time T0. The second multiplexer MUX2 may output the (13_1)-th data voltage DD13_1 converted by the third digital-to-analog converter DAC3 as the third data voltage DDMX3 from the first time T1 to the third time T3 when the first switching control signal MSS1 is enabled such as to a high level. In addition, the second multiplexer MUX2 may output the (11_2)-th data voltage DD11_2 converted by the first digital-to-analog converter DAC1 as the third data voltage DDMX3 from the third time T3 to the fifth time T5 when the first switching control signal MSS1 is enabled again such as to a high level.

The first multiplexer MUX1 may operate according to the first switching control signal MSS1 that is enabled such as to a high level at a time that is delayed by the first delay time LDT1 from the time when the horizontal synchronization signal Hsync is enabled such as to a low level.

In this way, the data driver 130 may provide the first to sixth switching control signals MSS1 to MSS6 synchronized with the first to sixth latch clock signals CLKL1 to CLKL6 to the first to sixth buffer circuits 371 to 376 (see FIG. 5). Accordingly, the first to sixth buffer circuits 371 to 376 (see FIG. 5) may output data voltages at the same time as the first to sixth latch circuits 351 to 356 output line image data.

It is assumed that a spread method is applied to the first to sixth latch circuits 351 to 356 (see FIG. 5), and the first buffer circuit 371 to 376 (see FIG. 5) operates according to the first switching control signal MSS1' enabled such as to a high level at the time when the horizontal synchronization signal Hsync is enabled such as to a low level. In this case, while the multiplexers MUX1 to MUXk included in the first buffer circuit 371 selects the data voltages, the data voltages of the previous horizontal period may be output from the 0-th time T0 to the first time T1. For example, the first multiplexer MUX1 may output the (11_0)-th data voltage DD11_0 converted by the first digital-to-analog converter DAC1 rather than the third digital-to-analog converter DAC3 as the first data voltage DDMX1 from the 0-th time T0. In this way, the switching operations of the first to sixth buffer circuits 371 to 376 (see FIG. 5) may be performed before the outputs of the first to sixth latch circuits 351 to 356 (see FIG. 5). Due to this, data voltages corresponding to unintended line image data may be output in the previous horizontal period, thereby reducing the reliability of the data voltages and generating unnecessary dynamic currents.

On the other hand, according to an embodiment of the present disclosure, the first to sixth switching control signals MSS1 to MSS6 synchronized with the first to sixth latch clock signals CLKL1 to CLKL6 are provided to the first to sixth buffer circuits 371 to 376 (see FIG. 5). For example, the first multiplexer MUX1 may output the (13_0)-th data voltage DD13_0 as the first data voltage DDMX1 from the 0-th time T1 to the first time T1, and then output the (11_1)-th data voltage DD11_1 as the first data voltage DDMX1 from the first time T1 to the third time T3. Accordingly, the output data voltages may have high reliability, and consumption current may be reduced by reducing the occurrence of unnecessary dynamic currents. For example, the current consumption may be reduced to the same level as when the spread method is not applied to the first to sixth latch circuits 351 to 356 (see FIG. 5).

Figure 8:
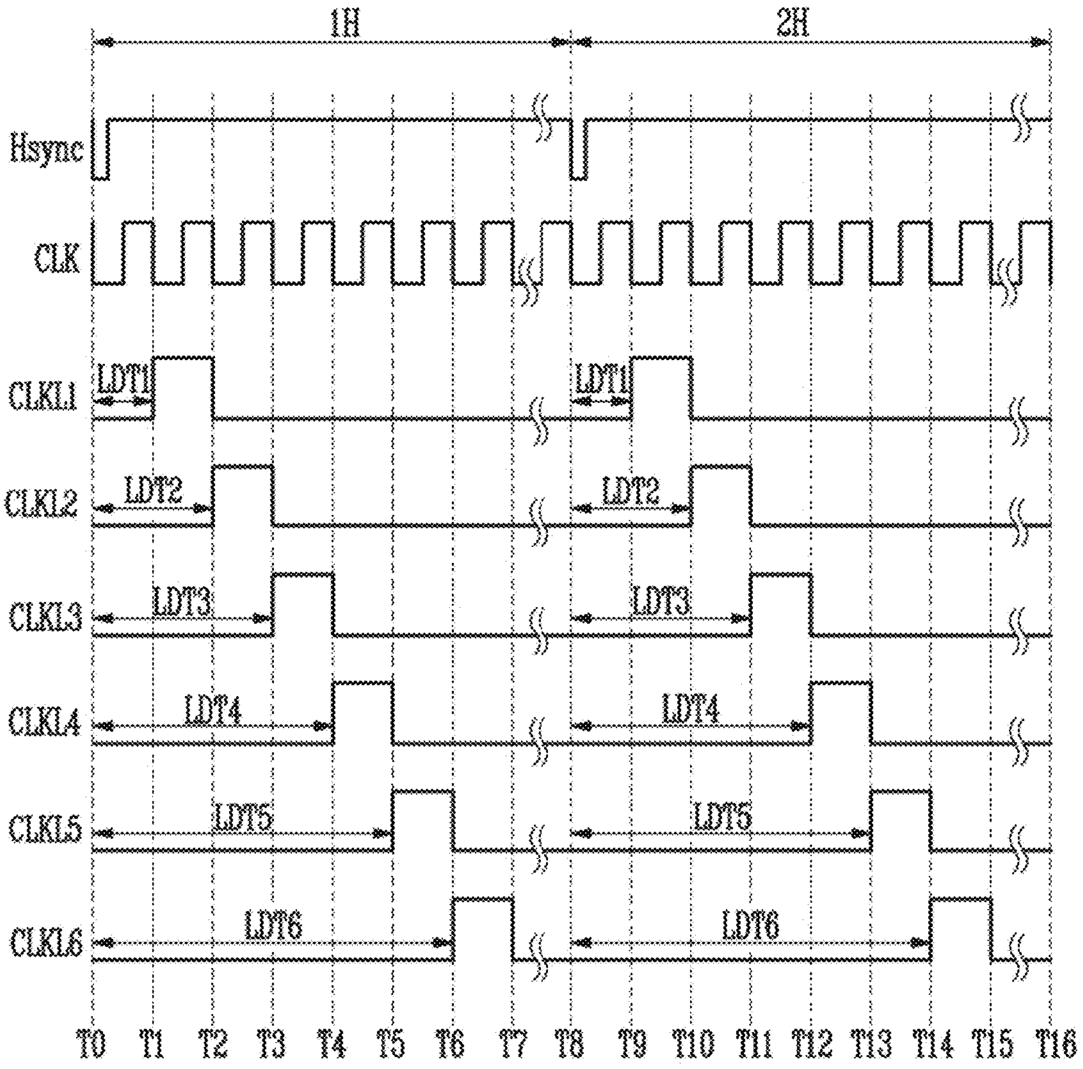
FIG. 8 is a timing diagram of an embodiment of latch clock signals of the data driver of FIG. 5 in a plurality of horizontal periods.

FIG. 8 illustrates an embodiment of latch clock signals of the data driver of FIG. 5 in a plurality of horizontal periods.

Referring to FIG. 5 and FIG. 8, the first to sixth latch circuits 351 to 356 may output line image data in response to the first to sixth latch clock signals CLKL1 to CLKL6.

The horizontal synchronization signal Hsync may include a plurality of pulses. The horizontal synchronization signal Hsync may indicate that a previous horizontal period ends and a new horizontal period starts based on the time when each pulse is generated. The horizontal synchronization signal Hsync may define the first and second horizontal periods H1 and H2 according to one pulse period. For example, the first horizontal period H1 may be defined as a period from the 0-th time T0 to the eighth time T8, and the second horizontal period H2 may be defined as a period from the eighth time T8 to the sixteenth time T16. In FIG. 8, the pulse of the horizontal synchronization signal Hsync is enabled such as to a low level, but is not limited thereto. For example, the pulse of the horizontal synchronization signal Hsync may be enabled such as to a high level.

The first to sixth latch clock signals CLKL1 to CLKL6 may be sequentially enabled in synchronization with a time when the horizontal synchronization signal Hsync is enabled.

For example, in the first horizontal period H1, the first latch clock signal CLKL1 may be enabled such as to a high level at the first time T1 and may be enabled such as to a low level at the second time T2. Here, the first time T1 may be a time that is delayed by the first delay time LDT1 from the 0-th time T0 when the horizontal synchronization signal Hsync is enabled such as to a low level. The first latch clock signal CLKL1 may be enabled such as at a low level from the second time T2 to the eighth time T8. In the first horizontal period H1, the first latch circuit 351 may output line image data corresponding to the first divided image data D1 in response to the first latch clock signal CLKL1 enabled such as to the high level.

In the first horizontal period H1, the second latch clock signal CLKL2 may be enabled such as to a high level at the second time T2 and may be enabled such as to a low level at the third time T3. Here, the second time T2 may be a time that is delayed by the second delay time LDT2 from the 0-th time T0 when the horizontal synchronization signal Hsync is enabled such as to a low level. The second latch clock signal CLKL2 may be enabled such as at a low level from the third time T3 to the eighth time T8. In the first horizontal period H1, the second latch circuit 352 may output line image data corresponding to the second divided image data D2 in response to the second latch clock signal CLKL2 enabled such as to the high level.

In the first horizontal period H1, the third latch clock signal CLKL3 may be enabled such as to a high level at the third time T3 and may be enabled such as to a low level at the fourth time T4. Here, the third time T3 may be a time that is delayed by the third delay time LDT3 from the 0-th time T0 when the horizontal synchronization signal Hsync is enabled such as to a low level. The third latch clock signal CLKL3 may be enabled such as at a low level from the fourth time T4 to the eighth time T8. In the first horizontal period H1, the third latch circuit 353 may output line image data corresponding to the third divided image data D3 in response to the third latch clock signal CLKL3 enabled such as at the high level.

In the first horizontal period H1, the fourth latch clock signal CLKL4 may be enabled such as to a high level at the fourth time T4, and may be enabled such as to a low level at the fifth time T5. Here, the fourth time T4 may be a time that is delayed by the fourth delay time LDT4 from the 0-th time T0 when the horizontal synchronization signal Hsync is enabled such as to a low level. The fourth latch clock signal CLKL4 may be enabled such as at a low level from the fifth time T5 to the eighth time T8. In the first horizontal period H1, the fourth latch circuit 354 may output line image data corresponding to the fourth divided image data D4 in response to the fourth latch clock signal CLKL4 enabled such as to the high level.

In the first horizontal period H1, the fifth latch clock signal CLKL5 may be enabled such as to a high level at the fifth time T5, and may be enabled such as to a low level at the sixth time T6. Here, the fifth time T5 may be a time that is delayed by the fifth delay time LDT5 from the 0-th time T0 when the horizontal synchronization signal Hsync is enabled such as to a low level. The fifth latch clock signal CLKL5 may be enabled such as at a low level from the sixth time T6 to the eighth time T8. In the first horizontal period H1, the fifth latch circuit 355 may output line image data corresponding to the fifth divided image data D5 in response to the fifth latch clock signal CLKL5 enabled such as to the high level.

In the first horizontal period H1, the sixth latch clock signal CLKL6 may be enabled such as to a high level at the sixth time T6 and may be enabled such as to a low level at the seventh time T7. Here, the sixth time T6 may be a time that is delayed by the sixth delay time LDT6 from the 0-th time T0 when the horizontal synchronization signal Hsync is enabled such as to a low level. The sixth latch clock signal CLKL6 may be enabled such as at a low level from the seventh time T7 to the eighth time T8. In the first horizontal period H1, the sixth latch circuit 356 may output line image data corresponding to the sixth divided image data D6 in response to the sixth latch clock signal CLKL6 enabled such as to the high level.

In the second horizontal period H2, the first latch clock signal CLKL1 may be enabled such as to a high level at the ninth time T9 and may be enabled such as to a low level at the tenth time T10. The second latch clock signal CLKL2 may be enabled such as to a high level at the tenth time T10, and may be enabled such as to a low level at the eleventh time T11. The third latch clock signal CLKL3 may be enabled such as to a high level at the eleventh time T11, and may be enabled such as to a low level at the twelfth time T12. The fourth latch clock signal CLKL4 may be enabled such as to a high level at the twelfth time T12, and may be enabled such as to a low level at the thirteenth time T13. The fifth latch clock signal CLKL5 may be enabled such as to a high level at the thirteenth time T13, and may be enabled such as to a low level at the fourteenth time T14. The sixth latch clock signal CLKL6 may be enabled such as to a high level at the fourteenth time T14, and may be enabled such as to a low level at the fifteenth time T15. The second horizontal period H2 may be configured similarly to the first horizontal period H1.

The times at which the first to sixth latch clock signals CLKL1 to CLKL6 are enabled such as to a high level may be different from each other. That is, the first to sixth delay times LDT1 to LDT6 may be different from each other. The first to sixth delay times LDT1 to LDT6 may be set based on the clock signal CLK. For example, the first to sixth delay times LDT1 to LDT6 may be different from each other by the first period of the clock signal CLK, but are not limited thereto. Accordingly, the first latch circuit 351 may respectively output the first to sixth divided image data D1 to D6 at different time points.

In this way, the data driver 130 may operate the first to sixth latch circuits 351 to 356 (see FIG. 5) in a spread manner in response to the first to sixth latch clock signals CLKL1 to CLKL6. Accordingly, the first to sixth latch circuits 351 to 356 output line image data at different time points, thereby reducing harmonic noise occurring in the display device DD. Thus, the de-sense phenomenon, which causes erroneous operation of the display device DD or deterioration of communication performance, may be controlled.

Figure 9:
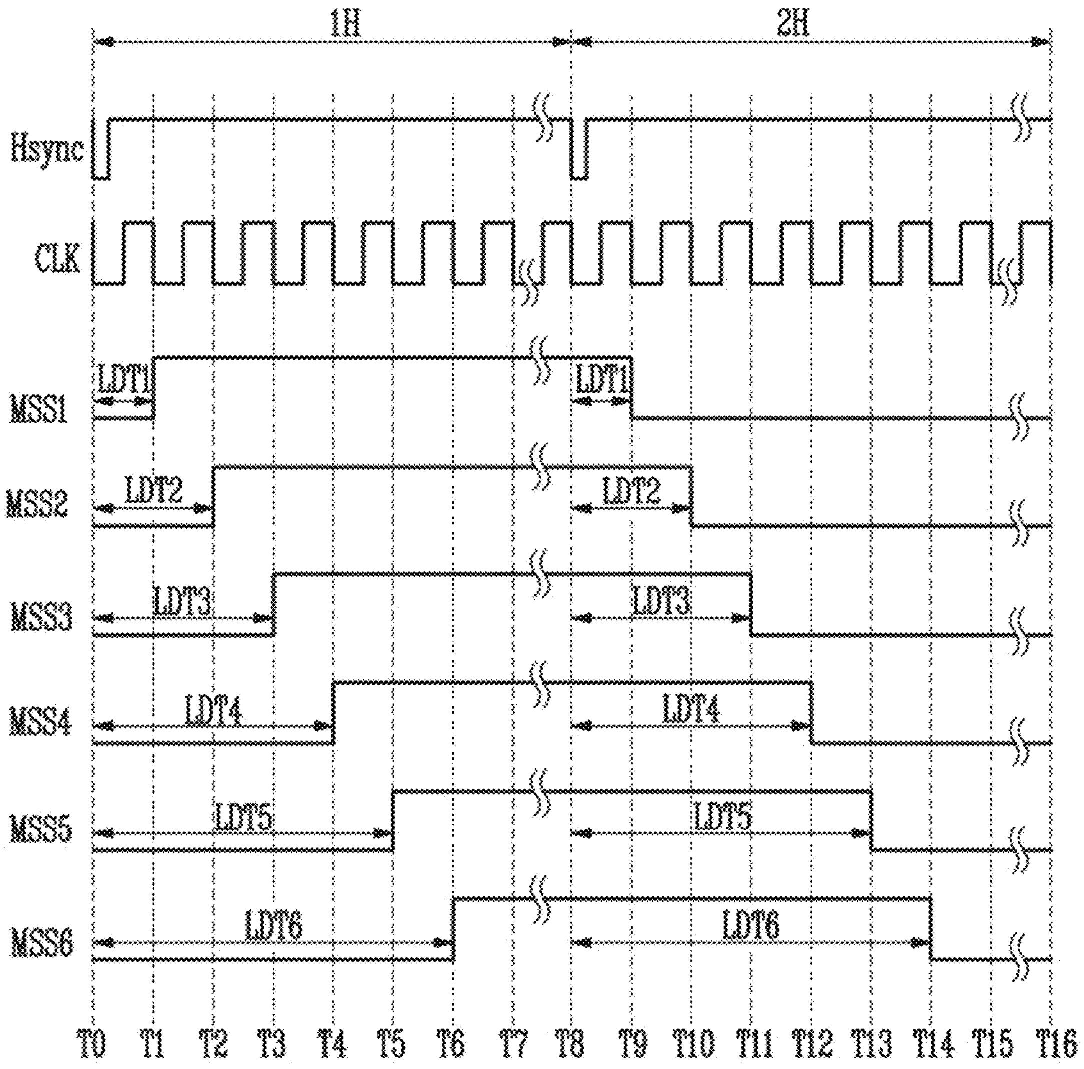
FIG. 9 is a timing diagram of an embodiment of switching control signals of the data driver of FIG. 5 in a plurality of horizontal periods.

FIG. 9 illustrates an embodiment of switching control signals of the data driver of FIG. 5 in a plurality of horizontal periods.

Referring to FIG. 5 and FIG. 9, the first to sixth buffer circuits 371 to 376 may output data voltages in response to the first to sixth switching control signals MSS1 to MSS6.

The first to sixth switching control signals MSS1 to MSS6 may be sequentially enabled in synchronization with a time when the horizontal synchronization signal Hsync is enabled.

For example, in the first horizontal period H1, the first switching control signal MSS1 may be enabled such as at a low level in the previous horizontal period from the 0-th time T0 to the first time T1. The first switching control signal MSS1 may be enabled such as to a high level at the first time T1. Here, the first time T1 may be a time that is delayed by the first delay time LDT1 from the 0-th time T0 when the horizontal synchronization signal Hsync is enabled such as to a low level. The first switching control signal MSS1 may be enabled such as at a high level from the first time T1 to the eighth time T8.

In the second horizontal period H2, the first switching control signal MSS1 may be enabled such as at a high level from the eighth time T8 to the ninth time T9. The first switching control signal MSS1 may be enabled such as to a low level at the ninth time T9. Here, the ninth time T9 may be a time that is delayed by the first delay time LDT1 from the eighth time T8 when the horizontal synchronization signal Hsync is enabled such as to a low level again. The first switching control signal MSS1 may be enabled such as at a low level from the ninth time T9 to the sixteenth time T16.

In the first and second horizontal periods H1 and H2, the first buffer circuit 371 may output data voltages corresponding to the first divided image data D1 to the first group of data lines DLS1 in response to the first switching control signal MSS1. For example, when the first switching control signal MSS1 is enabled such as to a high level, the first buffer circuit 371 may output one of the data voltages. When the first switching control signal MSS1 is enabled such as to a low level, the first buffer circuit 371 may output another one of the data voltages.

In the first horizontal period H1, the second switching control signal MSS2 may be maintained in a state enabled such as to a low level in the previous horizontal period from the 0-th time T0 to the second time T2. The second switching control signal MSS2 may be enabled such as to a high level at the second time T2. Here, the second time T2 may be a time that is delayed by the second delay time LDT2 from the 0-th time T0 when the horizontal synchronization signal Hsync is enabled such as to a low level. The second switching control signal MSS2 may be enabled such as at a high level from the second time T2 to the eighth time T8.

In the second horizontal period H2, the second switching control signal MSS2 may be enabled such as at a high level from the eighth time T8 to the tenth time T10. The second switching control signal MSS2 may be enabled such as to a low level at the tenth time T10. Here, the tenth time T10 may be a time that is delayed by the second delay time LDT2 from the eighth time T8 when the horizontal synchronization signal Hsync is enabled such as to a low level again. The second switching control signal MSS2 may be enabled such as at a low level from the tenth time T10 to the sixteenth time T16.

In the first and second horizontal periods H1 and H2, the second buffer circuit 372 may output data voltages corresponding to the second divided image data D2 to the second group of data lines DLS2 in response to the second switching control signal MSS2. For example, when the second switching control signal MSS2 is enabled such as to a high level, the second buffer circuit 372 may output one of the data voltages. When the second switching control signal MSS2 is enabled such as to a low level, the second buffer circuit 372 may output another one of the data voltages.

In the first horizontal period H1, the third switching control signal MSS3 may be maintained in a state enabled such as to a low level in the previous horizontal period from the 0-th time T0 to the third time T3. The third switching control signal MSS3 may be enabled such as to a high level at the third time T3. Here, the third time T3 may be a time that is delayed by the third delay time LDT3 from the 0-th time T0 when the horizontal synchronization signal Hsync is enabled such as to a low level. The third switching control signal MSS3 may be enabled such as at a high level from the third time T3 to the eighth time T8.

In the second horizontal period H2, the third switching control signal MSS3 may be enabled such as at a high level from the eighth time T8 to the eleventh time T11. The third switching control signal MSS3 may be enabled such as to a low level at the eleventh time T11. Here, the eleventh time T11 may be a time that is delayed by the third delay time LDT3 from the eighth time T8 when the horizontal synchronization signal Hsync is enabled such as to a low level again. The third switching control signal MSS3 may be enabled such as at a low level from the eleventh time T11 to the sixteenth time T16.

In the first and second horizontal periods H1 and H2, the third buffer circuit 373 may output data voltages corresponding to the third divided image data D3 to the third group of data lines DLS3 in response to the third switching control signal MSS3. For example, when the third switching control signal MSS3 is enabled such as to a high level, the third buffer circuit 373 may output one of the data voltages. When the third switching control signal MSS3 is enabled such as to a low level, the third buffer circuit 373 may output another one of the data voltages.

In the first horizontal period H1, the fourth switching control signal MSS4 may be maintained in a state enabled such as to a low level in the previous horizontal period from the 0-th time T0 to the fourth time T4. The fourth switching control signal MSS4 may be enabled such as to a high level at the fourth time T4. Here, the fourth time T4 may be a time that is delayed by the fourth delay time LDT4 from the 0-th time T0 when the horizontal synchronization signal Hsync is enabled such as to a low level. The fourth switching control signal MSS4 may be enabled such as at a high level from the fourth time T4 to the eighth time T8.

In the second horizontal period H2, the fourth switching control signal MSS4 may be enabled such as at a high level from the eighth time T8 to the twelfth time T12. The fourth switching control signal MSS4 may be enabled such as to a low level at the twelfth time T12. Here, the twelfth time T12 may be a time that is delayed by the fourth delay time LDT4 from the eighth time T8 when the horizontal synchronization signal Hsync is enabled such as to a low level again. The fourth switching control signal MSS4 may be enabled such as at a low level from the twelfth time T12 to the sixteenth time T16.

In the first and second horizontal periods H1 and H2, the fourth buffer circuit 374 may output data voltages corresponding to the fourth divided image data D4 to the fourth group of data lines DLS4 in response to the fourth switching control signal MSS4. For example, when the fourth switching control signal MSS4 is enabled such as to a high level, the fourth buffer circuit 374 may output one of the data voltages. When the fourth switching control signal MSS4 is enabled such as to a low level, the fourth buffer circuit 374 may output another one of the data voltages.

In the first horizontal period H1, the fifth switching control signal MSS5 may be maintained in a state enabled such as to a low level in the previous horizontal period from the 0-th time T0 to the fifth time T5. The fifth switching control signal MSS5 may be enabled such as to a high level at the fifth time T5. Here, the fifth time T5 may be a time that is delayed by the fifth delay time LDT5 from the 0-th time T0 when the horizontal synchronization signal Hsync is enabled such as to a low level. The fifth switching control signal MSS5 may be enabled such as at a high level from the fifth time T5 to the eighth time T8.

In the second horizontal period H2, the fifth switching control signal MSS5 may be enabled such as at a high level from the eighth time T8 to the thirteenth time T13. The fifth switching control signal MSS5 may be enabled such as to a low level at the thirteenth time T13. Here, the thirteenth time T13 may be a time that is delayed by the fifth delay time LDT5 from the eighth time T8 when the horizontal synchronization signal Hsync is enabled such as to a low level again. The fifth switching control signal MSS5 may be enabled such as at a low level from the thirteenth time T13 to the sixteenth time T16.

In the first and second horizontal periods H1 and H2, the fifth buffer circuit 375 may output data voltages corresponding to the fifth divided image data D5 to the fifth group of data lines DLS5 in response to the fifth switching control signal MSS5. For example, when the fifth switching control signal MSS5 is enabled such as to a high level, the fifth buffer circuit 375 may output one of the data voltages. When the fifth switching control signal MSS5 is enabled such as to a low level, the fifth buffer circuit 375 may output another one of the data voltages.

In the first horizontal period H1, the sixth switching control signal MSS6 may be maintained in a state enabled such as to a low level in the previous horizontal period from the 0-th time T0 to the sixth time T6. The sixth switching control signal MSS6 may be enabled such as to a high level at the sixth time T6. Here, the sixth time T6 may be a time that is delayed by the sixth delay time LDT6 from the 0-th time T0 when the horizontal synchronization signal Hsync is enabled such as to a low level. The sixth switching control signal MSS6 may be enabled such as at a high level from the sixth time T6 to the eighth time T8.

In the second horizontal period H2, the sixth switching control signal MSS6 may be enabled such as at a high level from the eighth time T8 to the 14th time T14. The sixth switching control signal MSS6 may be enabled such as to a low level at the fourteenth time T14. Here, the fourteenth time T14 may be a time that is delayed by the sixth delay time LDT6 from the eighth time T8 when the horizontal synchronization signal Hsync is enabled such as to a low level again. The sixth switching control signal MSS6 may be enabled such as at a low level from the fourteenth time T14 to the sixteenth time T16.

In the first and second horizontal periods H1 and H2, the sixth buffer circuit 376 may output data voltages corresponding to the sixth divided image data D6 to the sixth group of data lines DLS6 in response to the sixth switching control signal MSS6. For example, when the sixth switching control signal MSS6 is enabled such as to a high level, the sixth buffer circuit 376 may output one of the data voltages. When the sixth switching control signal MSS6 is enabled such as to a low level, the sixth buffer circuit 376 may output another one of the data voltages.

In the first and second horizontal periods H1 and H2, the time at which each of the first to sixth switching control signals MSS1 to MSS6 is enabled such as to a high level may be the same as the time at which each of the first to sixth latch clock signals CLKL1 to CLKL6 is enabled. As described above, the first to sixth switching control signals MSS1 to MSS6 may be synchronized with the first to sixth latch clock signals CLKL1 to CLKL6. Accordingly, the first to sixth buffer circuits 371 to 378 may operate in conjunction with the first to sixth latch circuits 351 to 367. Specifically, the first to sixth buffer circuits 371 to 378 may output data voltages simultaneously with a set output time point of the first to sixth latch circuits 351 to 367. Accordingly, by reducing the unnecessary dynamic current occurring in the data driver 130, the current and/or power supplied to and/or consumed by the display device DD may be minimized.

Figure 10:
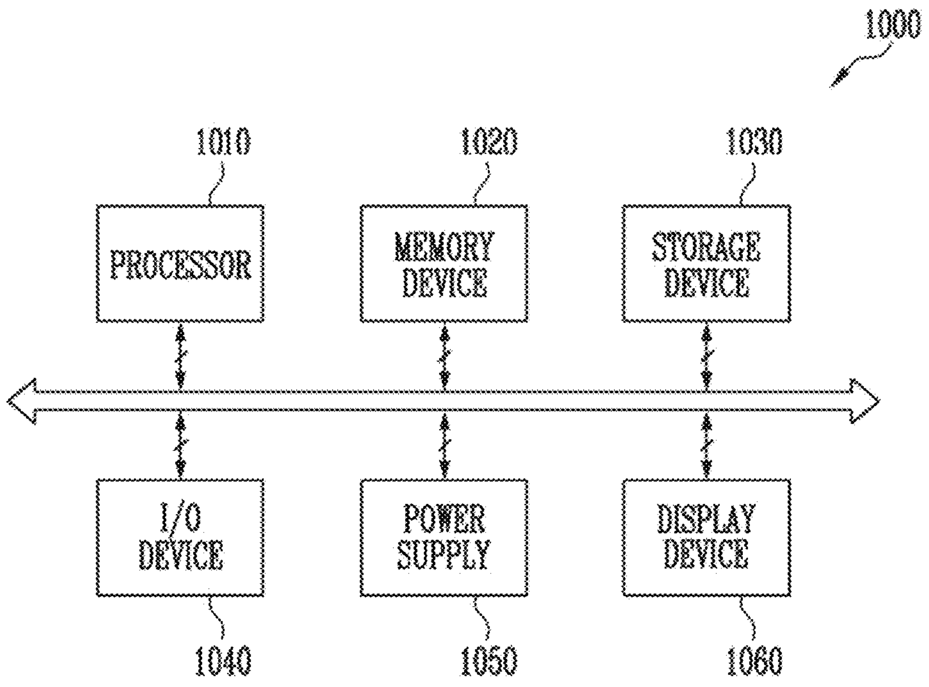
FIG. 10 is a schematic block diagram of an embodiment of an electronic device including a display device according to an embodiment of the present disclosure.

FIG. 10 illustrates an electronic device including a display device according to an embodiment of the present disclosure.

Referring to FIG. 10, an electronic device 1000 may include a processor 1010, a memory device 1020, a storage device 1030, an input/output device 1040, a power supply 1050, and a display device 1060. The display device 1060 may be the display device DD of FIG. 1. In addition, the electronic device 1000 may further include several ports capable of communicating with a video card, a sound card, a memory card, a USB device, and the like, or communicating with other systems. In an embodiment, the electronic device 1000 may be implemented as a smart phone. In another embodiment, the electronic device 1000 may be implemented as a tablet PC. However, this is an example, and the electronic device 1000 is not limited thereto. For example, the electronic device 1000 may be implemented as a mobile phone, a video phone, a smart pad, a smart watch, a vehicle navigation, a computer monitor, a laptop, a head mounted display device, or the like.

The processor 1010 may perform specific calculations or tasks. In an embodiment, the processor 1010 may be a micro-processor, a central processing unit, an application processor, or the like. The processor 1010 may be connected to other constituent elements through an address bus, a control bus, and a data bus. In an embodiment, the processor 1010 may also be connected to an extension bus such as a peripheral component interconnect (PCI) bus. According to an embodiment, the processor 1010 may provide input image data to the display device 1060, and accordingly, the display device 1060 may display an image based on the input image data provided by the processor 1010.

The memory device 1020 may store data for operations of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random-access memory (PRAM) device, a resistance random-access memory (RRAM) device, a nano floating gate memory (NFGM) device, a polymer random-access memory (PoRAM) device, a magnetic random-access memory (MRAM) device, and a ferroelectric random-access memory (FRAM) device, and/or volatile memory devices such as a dynamic random-access memory (DRAM) device, a static random-access memory (SRAM) device, a mobile DRAM device, or the like.

The storage device 1030 may include a solid-state drive (SSD), a hard disk drive (HDD), a CD-ROM, and the like.

The input/output unit or device 1040 may include input devices such as a keyboard, a keypad, a touch pad, a touchscreen, mouse, and the like, and output devices such as a speaker, a printer, and the like. In an embodiment, the display device 1060 may be included in the input/output device 1040.

The power supply 1050 may supply power for the operation of the electronic device 1000. For example, the power supply 1050 may be a power management integrated circuit (PMIC). According to an embodiment, the power supply 1050 may supply power to the display device 1060.

The display device 1060 may display an image corresponding to visual information of the electronic device 1000. The display device 1060 may be connected to other constituent elements through the buses or other communication links.

In the display device and the method of controlling the pixels according to embodiments of the present disclosure, the display device may reduce unnecessary dynamic current and improve the de-sense phenomenon in which communication performance deteriorates due to noise by providing a switching control signal synchronized with a latch clock signal delayed from a horizontal synchronization signal to the output buffer portion.

According to an embodiment of the present disclosure, a display device with high reliability and a method of controlling pixels are provided.

Effects of the above and other embodiments of the present disclosure are not limited by what is illustrated in the above, and various other effects are included within the scope of the present specification.

Although illustrative embodiments and implementations have been described herein, other embodiments and modifications will be apparent from this description. Accordingly, the inventive concept is not limited to the illustrated embodiments, but rather to the scope and spirit of the presented claims as well as modifications thereof and equivalent arrangements as may be understood by those of ordinary skill in the pertinent art.

What is claimed is:

1. A display device comprising:

a display panel including pixels; and a data driver connected to the pixels through data lines, wherein the data driver includes:

a latch unit that receives first image data synchronized with a horizontal synchronization signal and outputs the first image data in response to a first latch clock signal generated at a time that is delayed from a time at which the horizontal synchronization signal is generated;

a converting unit that generates data voltages corresponding to the first image data using gamma voltages; and an output buffering unit having a plurality of multiplexers that output the data voltages corresponding to the first image data to some of the data lines in response to a first switching control signal generated at a time that is delayed from a time at which the horizontal synchronization signal is generated.

2. The display device of claim 1, wherein the first latch clock signal and the first switching control signal are synchronized with the horizontal synchronization signal, wherein at least one edge of the first switching control signal is synchronized with at least one edge of the first latch clock signal.

3. The display device of claim 1, wherein the first switching control signal is synchronized with the first latch clock signal.

4. The display device of claim 1, wherein the first latch clock signal is generated at a time that is delayed by a first time from the time at which the horizontal synchronization signal is generated, and wherein the first switching control signal is generated at the time that is delayed by the first time from the time at which the horizontal synchronization signal is generated.

5. The display device of claim 4, wherein the converting unit comprises a digital-to-analog converter, wherein the latch unit includes:

a first latch that outputs the first image data in response to the first latch clock signal; and a second latch that receives second image data synchronized with the horizontal synchronization signal and outputs the second image data in response to a second latch clock signal generated at a time that is delayed by a second time from a time at which the horizontal synchronization signal is generated, wherein the digital-to-analog converter further generates data voltages corresponding to the second image data using the gamma voltages, and wherein the output buffering unit includes:

a first buffer circuit that outputs the data voltages corresponding to the first image data to a set of the data lines in response to the first switching control signal; and a second buffer circuit that outputs the data voltages corresponding to the second image data to another set of the data lines in response to a second switching control signal generated at a time that is delayed by the second time from a time at which the horizontal synchronization signal is generated.

6. The display device of claim 5, wherein the second time is different from the first time.

7. The display device of claim 1, wherein the data driver further includes a shift register that stores the first image data based on the horizontal synchronization signal, and wherein the latch unit receives the first image data from the shift register.

8. The display device of claim 1, wherein the data driver further includes a control unit that enables each of the first latch clock signal and the first switching control signal at a time that is delayed from a time at which the horizontal synchronization signal is generated.

9. The display device of claim 1, wherein the data lines include first and second data lines, and wherein the output buffering unit includes:

a first multiplexer that receives first and second data voltages among the data voltages and selectively outputs one of the first and second data voltages to the first data line in response to the first switching control signal; and a second multiplexer that receives the first and second data voltages and selectively outputs one of the first and second data voltages to the second data line in response to the first switching control signal.

10. The display device of claim 9, wherein the first multiplexer outputs the first data voltage when the first switching control signal has a first logic level, and outputs the second data voltage when the first switching control signal has a second logic level, and wherein the second multiplexer outputs the second data voltage when the first switching control signal has the first logic level, and outputs the first data voltage when the first switching control signal has the second logic level.

11. The display device of claim 9, wherein the output buffering unit further includes:

a first amplifier connected between the first multiplexer and the first data line; and a second amplifier connected between the second multiplexer and the second data line.

12. A method of controlling pixels connected to data lines, comprising:

providing first image data synchronized with a horizontal synchronization signal;

generating a first latch clock signal at a time that is delayed from a time at which the horizontal synchronization signal is generated;

outputting the first image data in response to the first latch clock signal;

generating data voltages corresponding to the first image data using gamma voltages;

generating a first switching control signal at a time that is delayed from a time at which the horizontal synchronization signal is generated; and outputting data voltages corresponding to the first image data through a plurality of multiplexers to a set of the data lines in response to the first switching control signal.

13. The method of claim 12, wherein the first latch clock signal is generated at a time that is delayed by a first time from the time at which the horizontal synchronization signal is generated, and wherein the first switching control signal is generated at the time that is delayed by the first time from the time at which the horizontal synchronization signal is generated.

14. The method of claim 13, further comprising:

providing second image data synchronized with the horizontal synchronization signal;

generating a second latch clock signal at a time that is delayed by a second time from a time at which the horizontal synchronization signal is generated;

outputting the second image data in response to the second latch clock signal;

generating data voltages corresponding to the second image data using the gamma voltages;

generating a second switching control signal at a time that is delayed by the second time from a time at which the horizontal synchronization signal is generated; and outputting data voltages corresponding to the second image data to another set of the data lines in response to the second switching control signal.

15. The method of claim 14, wherein the second time is different from the first time.

16. The method of claim 12, wherein the outputting of the data voltages corresponding to the first image data to some of the data lines further includes:

receiving first and second data voltages of the data voltages;

selectively outputting one of the first and second data voltages to a first data line among the data lines in response to the first switching control signal; and selectively outputting one of the first and second data voltages to a second data line among the data lines in response to the first switching control signal.

17. The method of claim 16, wherein the outputting to the first data line among the data lines includes outputting the first data voltage when the first switching control signal has a first logic level and outputting the second data voltage when the first switching control signal has a second logic level, and wherein the outputting to the second data line among the data lines includes outputting the second data voltage when the first switching control signal has the first logic level and outputting the first data voltage when the first switching control signal has the second logic level.

18. An electronic device comprising:

a processor;

a memory;

a power supply;

an input/output unit;

a display panel including pixels; and a data driver connected to the pixels through data lines, wherein the data driver includes:

a latch unit that receives first image data synchronized with a horizontal synchronization signal and outputs the first image data in response to a first latch clock signal generated at a time that is delayed from a time at which the horizontal synchronization signal is generated;

a converting unit that generates data voltages corresponding to the first image data using gamma voltages; and an output buffering unit having a plurality of multiplexers that output the data voltages corresponding to the first image data to some of the data lines in response to a first switching control signal generated at a time that is delayed from a time at which the horizontal synchronization signal is generated.

19. The electronic device of claim 18, wherein the data driver further includes a shift register that stores the first image data based on the horizontal synchronization signal, wherein the latch unit receives the first image data from the shift register, wherein at least one edge of the first switching control signal is synchronized with at least one edge of the first latch clock signal.

20. The electronic device of claim 18, wherein the data driver further includes a control unit that enables each of the first latch clock signal and the first switching control signal at a time that is delayed from a time at which the horizontal synchronization signal is generated.

* * * * *